United States Patent
Hasegawa et al.

(10) Patent No.: US 8,065,047 B2
(45) Date of Patent: Nov. 22, 2011

(54) CONTROL APPARATUS OF A HYBRID VEHICLE AND METHOD FOR CONTROLLING THE SAME

(75) Inventors: Masami Hasegawa, Yokohama (JP);
Haruhisa Tsuchikawa, Yokohama (JP);
Susumu Yoshida, Mitaka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 588 days.

(21) Appl. No.: 12/323,803

(22) Filed: Nov. 26, 2008

(65) Prior Publication Data

US 2009/0143189 A1    Jun. 4, 2009

(30) Foreign Application Priority Data

Nov. 29, 2007   (JP) .................................. 2007-308140

(51) Int. Cl.
*G05D 3/00*    (2006.01)

(52) U.S. Cl. ........................................................ 701/22

(58) Field of Classification Search .................. 701/22, 701/67, 68, 82, 90; 477/5, 6, 98; 903/946; 192/82 T, 103 R; 180/65.21, 65.22, 65.25, 180/65.265, 65.275, 65.6, 65.7
See application file for complete search history.

(56) References Cited

U.S. PATENT DOCUMENTS

| | | | | |
|---|---|---|---|---|
| 5,841,201 A | * | 11/1998 | Tabata et al. | 290/40 C |
| 5,856,709 A | * | 1/1999 | Ibaraki et al. | 290/45 |
| 2005/0209044 A1 | * | 9/2005 | Imazu et al. | 477/15 |
| 2007/0272456 A1 | | 11/2007 | Shiiba | |
| 2007/0275819 A1 | | 11/2007 | Hirata | |

FOREIGN PATENT DOCUMENTS

| | | |
|---|---|---|
| DE | 10158536 A1 | 7/2003 |
| DE | 10204982 A1 | 8/2003 |
| EP | 1839987 A2 | 10/2007 |
| JP | 2001-263383 | 9/2001 |
| WO | 03074894 A2 | 9/2003 |
| WO | 2007045785 A1 | 4/2007 |

* cited by examiner

*Primary Examiner* — Kim T Nguyen
(74) *Attorney, Agent, or Firm* — Young Basile

(57) ABSTRACT

Disclosed herein are embodiments of a control apparatus for a hybrid vehicle that is capable of suppressing overheating of the second clutch. Control is switched between engine-used slip drive control and motor drive control on a basis of a temperature of the second clutch. Control methods for a hybrid vehicle are also disclosed.

16 Claims, 14 Drawing Sheets

US 8,065,047 B2

CONTROL APPARATUS OF A HYBRID VEHICLE AND METHOD FOR CONTROLLING THE SAME

CROSS-REFERENCE TO RELATED APPLICATION

This application claims priority from Japanese Patent Application Serial No. 2007-308140, filed Nov. 29, 2007, which is incorporated herein in its entirety by reference.

TECHNICAL FIELD

The present invention relates to a control apparatus for a hybrid vehicle in which an engine and a motor are power sources and to a method for controlling such a hybrid vehicle.

BACKGROUND

Japanese Patent Application Publication No. 2001-263383 published on Sep. 26, 2001 describes a control apparatus for a hybrid vehicle. In this Japanese Patent Application Publication, the hybrid vehicle includes a first clutch disposed to connect and disconnect the engine to and from the motor, a second clutch disposed to connect and disconnect the motor to and from drive wheels and an automatic transmission. The hybrid vehicle is further provided with an engine-used drive mode in which the vehicle travels while the engine is included as an additional power source. For the engine to have a minimum revolution speed at which the engine is independently operable even in a low shift ratio, such as first gear and during extremely low vehicle speed travel (including the start of vehicle travel), the second clutch is slipped to secure an independent revolution (or a self-rotation) of the engine. That is, with the second clutch slipped, the engine is revolved at a revolution speed equal to or higher than an independent revolution speed (a self-rotation speed), while the drive wheels are revolved at an extremely low revolution speed.

BRIEF SUMMARY

Embodiments of a control apparatus and control methods for a hybrid-vehicle and methods are taught herein. One embodiment of a control apparatus for a hybrid vehicle comprises an engine, a motor configured to output a driving force of the vehicle, a first clutch installed between the engine and the motor, the first clutch configured to connect and disconnect the engine and the motor, a second clutch installed between the motor and drive wheels, the second clutch configured to connect and disconnect the motor and the drive wheels, a temperature detector for detecting a temperature of the second clutch and a controller configured to control the first clutch, the second clutch, the engine and the motor. The controller is configured to select a drive mode from at least one of the following: an engine-used slip drive mode in which the first clutch is engaged, the second clutch is slip engaged, and the engine is operated at a predetermined first revolution speed; and a motor drive mode in which the first clutch is disengaged, the second clutch is at least slip engaged, and the motor is operated at a second revolution speed which is less than the predetermined first revolution speed. The controller is configured to select the drive mode based the temperature of the second clutch.

Another embodiment of a control apparatus for a hybrid vehicle having an engine, a motor, a first clutch installed between the engine and the motor and a second clutch installed between the motor and drive wheels comprises means for determining a temperature of the second clutch, means for controlling the engine, means for controlling the motor and means for selecting a drive mode based on the temperature of the second clutch from at least one of an engine-used slip drive mode and a motor drive mode. In the engine-used slip drive mode, the first clutch is engaged, the second clutch is slip engaged, and the engine is operated at a first revolution speed. In the motor drive mode, the first clutch is disengaged, the second clutch is at least slip engaged, and the motor is operated at a second revolution speed which is less than the first revolution speed.

An embodiment of a control method for a hybrid vehicle comprises determining a temperature of the second clutch and selecting a drive mode with a controller based on the temperature of the second clutch from at least one of a motor drive mode and an engine-used slip drive mode. The motor drive mode comprises disengaging the first clutch, slip-engaging the second clutch and operating the motor at a second revolution speed which is lower than a first revolution speed. The engine-used slip drive mode comprises engaging the first clutch, slip-engaging the second clutch and operating the engine at the first revolution speed.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the control apparatus for the hybrid vehicle disclosed in the above-described Japanese Patent Application Publication No. 2001-263383, there is a possibility of an overheating of the second clutch when the above-described drive mode at a low shift ratio, such as first gear and during extremely low vehicle speed travel, is continued. In contrast, embodiments of the invention provide a control apparatus and method for controlling a hybrid vehicle that is capable of suppressing the overheating of the second clutch.

Hereinafter, certain embodiments of the control apparatus of the hybrid vehicle of the invention will be explained in detail with reference to the drawings.

Figure 1:
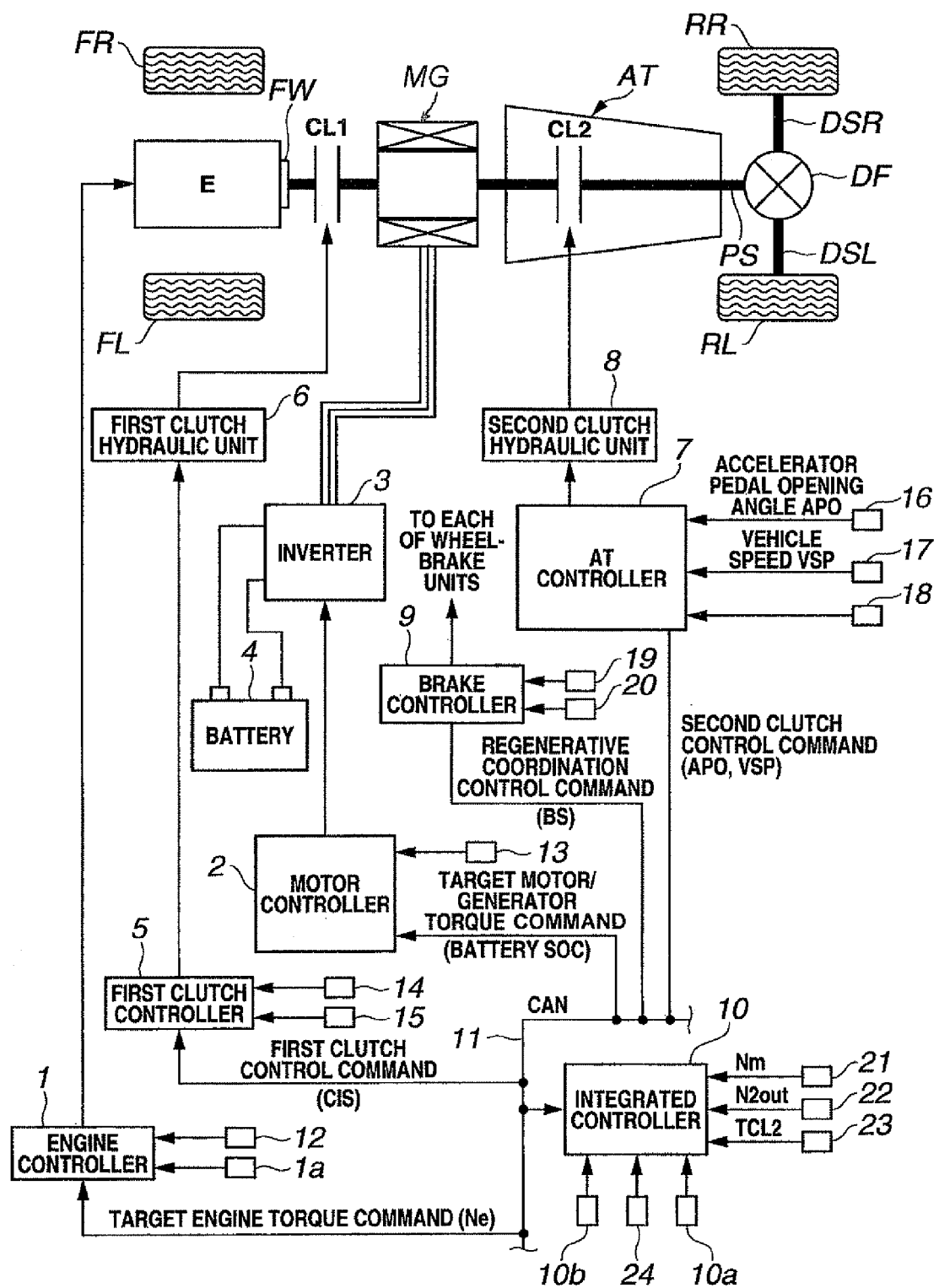
FIG. 1 is an overall system configuration of a rear-wheel drive hybrid vehicle in a first embodiment according to the invention.

First, a drive system of a hybrid vehicle will be explained. In FIG. 1, a system diagram showing a rear-wheel drive hybrid vehicle employing an engine start control system of the first embodiment is illustrated. The drive system of the hybrid vehicle in the first embodiment has, as shown in FIG. 1, an engine E, a first clutch CL1, a motor-generator MG, a second clutch CL2, an automatic transmission AT, a propeller shaft PS, a differential gear DF, a left drive shaft DSL, a right drive shaft DSR, a rear-left wheel RL (drive wheel) and a rear-right wheel RR (drive wheel). It should also be noted that FL is a front-left wheel, and FR is a front-right wheel.

The engine E is, for instance, a gasoline engine, and includes a throttle valve whose valve opening angle is controlled on the basis of a control command from an engine controller 1. Here, a flywheel FW is installed on an output shaft of engine E.

The first clutch CL1 is a clutch installed between the engine E and the motor-generator MG whose engagement and disengagement, including a slip-engagement, are controlled by control pressure produced by a first clutch hydraulic unit 6 on the basis of a control command from a first clutch controller 5.

The motor-generator MG is a synchronous type motor-generator in which permanent magnets are embedded into a rotor and stator coils are wound around a stator. The motor-generator MG is controlled by a three-phase alternating current generated by an inverter 3 and applied based on a control command from a motor controller 2. This motor-generator MG can be operated as an electric motor that revolves by receiving a supply of electrical power from a battery 4 (hereinafter, this state is called a power running state). In a case where the rotor is rotated by an external force, the motor-generator MG can also be operated as a generator that generates an electromotive force at both ends of the stator coil to enable charging of the battery 4 (hereinafter, this operating state is called a regenerative state). Here, the rotor of this motor-generator MG is connected to an input shaft of the automatic transmission AT through a damper (not shown).

The second clutch CL2 is a clutch that is installed between the motor-generator MG and the rear-left and rear-right wheels RL, RR, whose engagement and disengagement, including a slip-engagement, are controlled by control pressure produced by a second clutch hydraulic unit 8 based on a control command from an AT controller 7.

The automatic transmission AT is a stepped automatic transmission in which a gear ratio of limited stages, such as five forward speeds and one reverse speed, can automatically be shifted according to vehicle operating conditions, such as a vehicle speed and an accelerator opening angle. The second clutch CL2 is not necessarily a clutch that is further added as a special clutch. Instead, some clutch elements from a plurality of clutches which are selectively engaged at each respective gear shift stage of the automatic transmission AT may comprise the second clutch CL2.

An output shaft of the automatic transmission AT is connected to the rear-left and rear-right wheels RL, RR through the propeller shaft PS, the differential gear DF, the left drive shaft DSL and the right drive shaft DSR, respectively. With regard to the first and second clutches CL1 and CL2, a wet multiple disc clutch whose hydraulic flow amount and hydraulic pressure can be continuously controlled by a proportional solenoid is used for each.

This hybrid drive system has three basic drive modes according to a state of the engagement and disengagement of the first clutch CL1. A first drive mode is an electric vehicle drive mode (hereinafter called an EV drive mode) in which the first clutch CL1 is in a disengaged state and the vehicle travels by only the power of the motor-generator MG as the power source. A second drive mode is a hybrid drive mode (hereinafter called an HEV drive mode) in which the first clutch CL1 is in an engaged state and the vehicle travels while at least the engine E is the power source. Here, when changing the mode from the EV drive mode to the HEV drive mode, the first clutch CL1 is in the engaged state, and the engine start is carried out by applying the torque of the motor-generator MG to the engine E. A third drive mode is an engine-used slip drive mode (Wet Start Clutch drive mode, hereinafter called a WSC drive mode) in which the first clutch CL1 is in the engaged state and the second clutch CL2 is subjected to a slip control, and the vehicle travels while at least the engine E is the power source. While in the WSC drive mode, the vehicle is capable of achieving a creep drive, especially when a state of charge (SOC) of a battery 4 is low or when an engine water temperature is low.

When a driver controls an accelerator pedal to maintain a vehicle stopped state while on an incline with a gradient greater than or equal to a predetermined value (accelerator hill hold), the slip amount of the second clutch CL2 may be too large and will continue in this state in the WSC drive mode. The slip amount of the second clutch CL2 is too large in this case because the revolution speed of the engine E (revolutions per minute, or engine rpm) cannot be set to be lower than an engine idling speed. Accordingly, in the first embodiment, the vehicle further employs a fourth drive mode, which is a motor slip drive mode (Motor Wet Start Clutch drive mode, hereinafter called an MWSC drive mode) in which the first clutch CL1 is disengaged while engine E is operated, and the slip control of the second clutch CL2 is performed while the motor-generator MG is operating. In this manner, the vehicle travels with the motor-generator MG being the only power source even though the engine continues operating.

The above-described HEV drive mode includes three drive modes: an engine drive mode, a motor-assisted drive mode and a running electric power generation mode (hereinafter called a drive generation mode).

In the engine drive mode, the drive wheels are driven with only the engine E as the power source. In the motor-assisted drive mode, the drive wheels are driven with both of the engine E and the motor-generator MG as power sources. In the drive generation mode, while the drive wheels RL, RR are being driven with the engine E as the power source, the motor-generator MG works as a generator to charge the battery 4.

One example of the drive generation mode is during a constant speed (cruise) drive or during an acceleration drive, the motor-generator MG works as the generator by utilizing the power from the engine E to charge the battery 4. In addition, during a deceleration drive, a regeneration of braking energy is carried out to generate electric power by means of the motor-generator MG, and this regenerated power is used to charge the battery 4.

Another example of the drive generation mode occurs while the vehicle is in a stopped state. In this case, the motor-generator MG is operated, utilizing the power of the engine E to charge the battery 4.

Next, a control system of the hybrid vehicle will be explained. As shown in FIG. 1, the control system of the hybrid vehicle has the engine controller 1, the motor controller 2, the inverter 3, the battery 4, the first clutch controller 5, the first clutch hydraulic unit 6, the AT controller 7, the second clutch hydraulic unit 8, a brake controller 9 and an integrated controller 10. Here, the engine controller 1, the motor controller 2, the first clutch controller 5, the AT controller 7, the brake controller 9 and the integrated controller 10 are connected with each other through a CAN communication line 11 that allows the exchange of information between them.

Each of the controllers 1, 2, 5, 7, 9 and 10 are implemented in, for example, a conventional engine control unit such as is known in the art. Each is thus a microcomputer including a random access memory (RAM), a read-only memory (ROM) and a central processing unit (CPU), along with various input and output connections. Generally, the control functions described herein and associated with the controllers, including the various sections of the integrated controller 10 are performed by execution by the CPU of one or more software programs stored in ROM. Of course, some or all of the functions can be implemented by hardware components. Further, although multiple controllers are shown, the various functions can be incorporated in more or fewer controllers.

The engine controller 1 receives information of the engine revolution speed (the engine rpm) from an engine rpm sensor 12 and outputs a command that controls an engine operating point (Ne: the engine revolution speed, Te: an engine torque) to a throttle valve actuator (not shown in the drawing), for example, in accordance with a target engine torque command from the integrated controller 10. The information such as the engine revolution speed Ne, etc., is sent to the integrated controller 10 via the CAN communication line 11.

The motor controller 2 receives information from a resolver 13 that detects a rotational position of the rotor of the motor-generator MG and outputs a command that controls a motor operating point (Nm: a motor-generator revolution speed, Tm: a motor-generator torque) of the motor-generator MG to the inverter 3 in accordance with a target motor-generator torque command from the integrated controller 10. Here, the motor controller 2 checks or watches the battery SOC indicating the charge state of the battery 4. The information concerning the battery SOC is used to control the motor-generator MG and is also sent to the integrated controller 10 via the CAN communication line 11.

The first clutch controller 5 receives sensor information from both of a first clutch hydraulic pressure sensor 14 and a first clutch stroke sensor 15 and outputs a command to the first clutch hydraulic unit 6 in accordance with a first clutch control command from the integrated controller 10 to control the engagement and disengagement of the first clutch CL1. Here, information regarding a first clutch stroke C1S is sent to the integrated controller 10 via the CAN communication line 11.

The AT controller 7 receives input corresponding to sensor information from an accelerator opening angle sensor 16, a vehicle speed sensor 17, a second clutch hydraulic pressure sensor 18 and an inhibitor switch (not shown in the drawing) that outputs a signal corresponding to a position of a shift lever that is operated by the driver. The AT controller 7 then outputs a command that controls the engagement and disengagement of the second clutch CL2 to the second clutch hydraulic unit 8 in an AT hydraulic pressure control valve in accordance with a second clutch control command from the integrated controller 10. Here, information of an accelerator opening angle APO and a vehicle speed VSP and the information from the inhibitor switch are sent to the integrated controller 10 via the CAN communication line 11.

The brake controller 9 receives sensor information from a road wheel speed sensor 19 that detects each wheel speed of the four road wheels and a brake stroke sensor 20. The brake controller 9 performs a regenerative coordination brake control on the basis of a regenerative coordination control command BS from the integrated controller 10 when, for instance, a braking force is insufficient to meet a braking force required according to a brake stroke sensor 20 in the case where only a regenerative braking force is supplied upon a brake operation by the brake pedal depression. In this way, the shortage of the braking force is compensated by a mechanical braking force (a braking force by a friction brake).

The integrated controller 10 manages consumption energy of the whole vehicle in order to allow the vehicle to travel at a maximum efficiency. The integrated controller 10 receives information from a motor revolution speed sensor 21 that detects the motor revolution speed Nm, a second clutch output revolution speed sensor 22 that detects an output revolution speed N2out of the second clutch CL2, a second clutch torque sensor 23 that detects a transmission torque capacity TCL2 of the second clutch CL2, a brake hydraulic pressure sensor 24, a temperature sensor 10a that detects a temperature of the second clutch CL2 and a G sensor 10b that detects a forward and a reverse acceleration. The integrated controller 10 also receives information obtained via the CAN communication line 11.

Further, the integrated controller 10 performs operating control of the engine E by the control command to the engine controller 1, an operating control of the motor-generator MG by the control command to the motor controller 2, the engagement and disengagement control of the first clutch CL1 by the control command to the first clutch controller 5 and the engagement and disengagement control of the second clutch CL2 by the control command to the AT controller 7.

Control executed in the integrated controller 10 in the first embodiment is now explained with reference to the control block diagram in FIG. 2. This control is executed for each control period, at a control cycle period of 10 ms for instance, in the integrated controller 10. The integrated controller 10 has a target drive force operating section 100, a mode selecting section 200, a target charge and discharge operating section 300, an operating point commanding section 400 and a speed change or shift control section 500.

Figure 3:
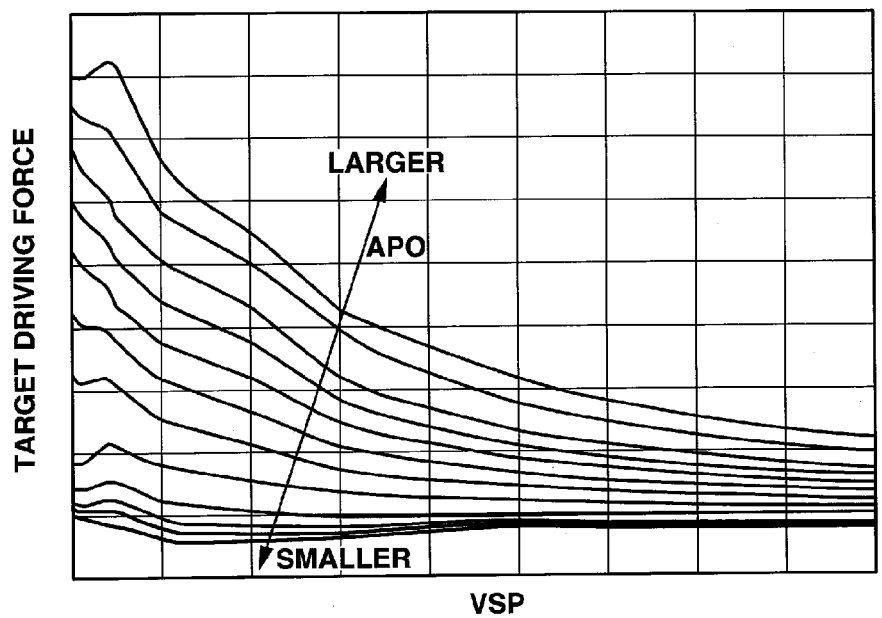
FIG. 3 is an example of a target driving force map used in a target driving force processing calculation at a target driving force calculating section shown in FIG. 2.

The target drive force operating section 100 computes a target drive force tFo0 on the basis of the accelerator opening angle APO and the vehicle speed VSP by using a target drive force map shown in FIG. 3.

The mode selecting section 200 has a road incline gradient estimation operating section 201 that estimates a gradient of a road incline on the basis of the detected value of the G sensor 10b. The road incline gradient estimation operating section 201 computes an actual acceleration on the basis of an average of acceleration of the wheel speed detected by the wheel speed sensor 19 and estimates the road incline gradient on the basis of the deviation between this computation result and the G sensor detection value (a difference between this computation result and the G sensor detection value).

Figure 4:
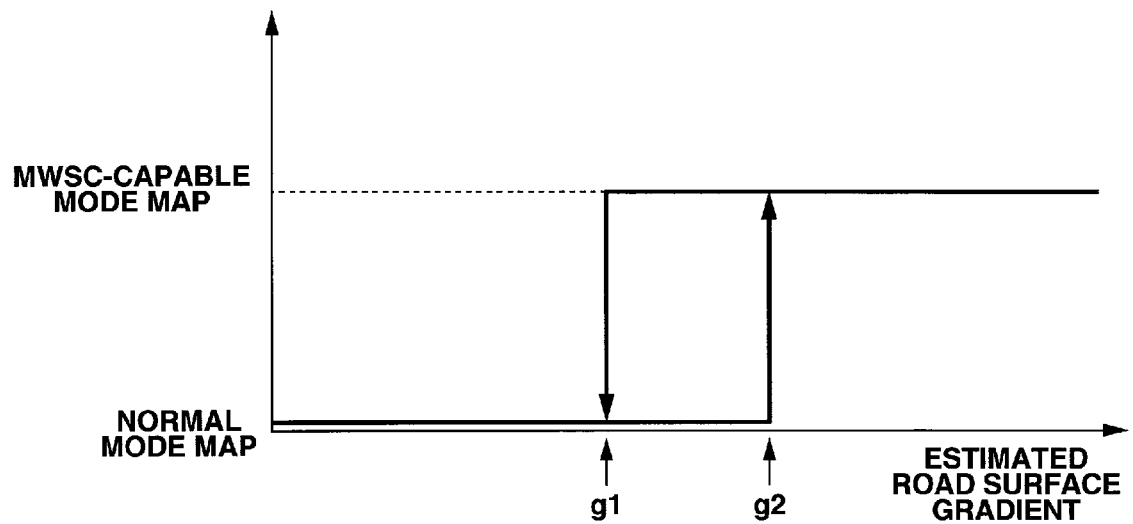
FIG. 4 is a map view representing a relationship between a mode map and an estimated road gradient at a mode selection section in FIG. 2.

The mode selecting section 200 further includes a mode map selecting section 202 that selects any one of two mode maps on the basis of the estimated road incline gradient. FIG. 4 is a schematic graph showing selection logic of the mode map selecting section 202. The mode map selecting section 202 switches the map from the normal mode map to an MWSC-capable mode map when the estimated road incline gradient becomes greater than or equal to a predetermined value g2. On the other hand, the mode map selecting section 202 switches from the MWSC-capable mode map to a normal mode map when the estimated road incline gradient becomes less than a predetermined value g1 (<g2). That is, a hysteresis is set for the estimated road incline gradient (for the change between both mode maps), thereby preventing a fluctuation during the map change.

Figure 5:
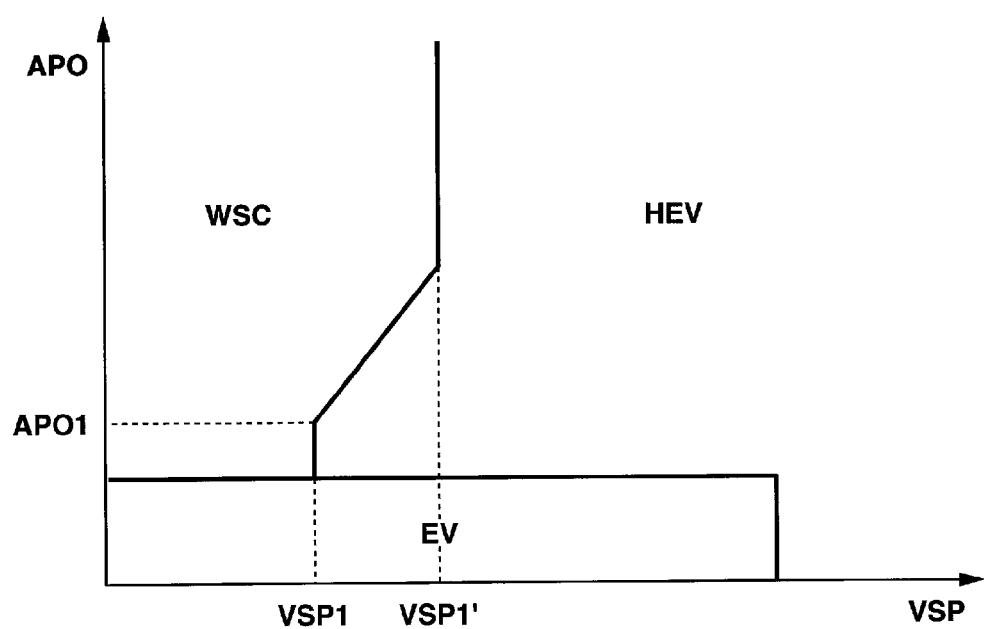
FIG. 5 is a map view representing a normal mode map used in a selection of a target mode at the mode selection section shown in FIG. 2.
Figure 6:
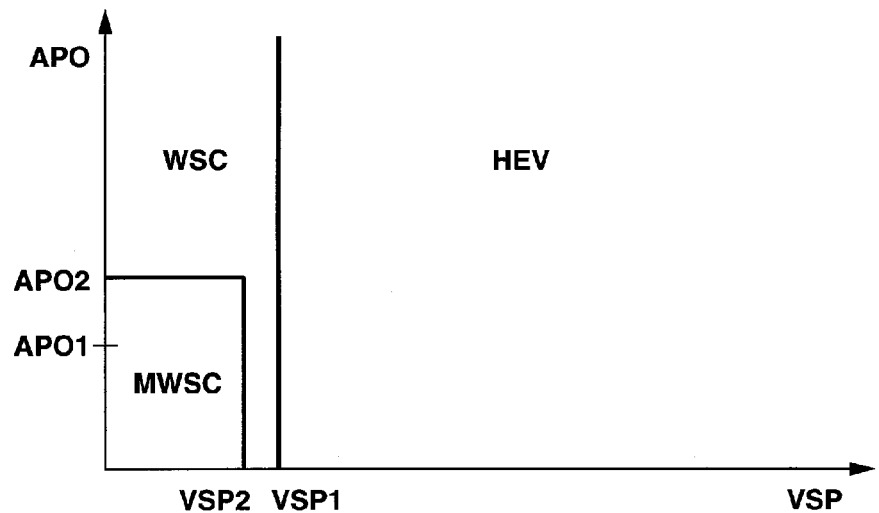
FIG. 6 is a map view representing an MWSC-capable road map used in the selection of the target mode at the mode selection section in FIG. 2.

Next, the mode maps are explained. The mode maps include the normal mode map selected when the estimated road incline gradient is less than the predetermined value g1, and the MWSC-capable mode map selected when the estimated road incline gradient is greater than or equal to the predetermined value g2. FIG. 5 illustrates the normal mode map. FIG. 6 illustrates the MWSC-capable mode map.

The normal mode map in FIG. 5 includes the EV drive mode, the WSC drive mode and the HEV drive mode. The target mode is set based on the accelerator opening degree APO and the vehicle speed VSP. It should be noted, however, that even if the EV drive mode is selected, the target mode is forced to select from either the HEV drive mode or the WSC drive mode if the battery SOC is smaller than a predetermined value.

In the normal mode map in FIG. 5, with regard to a switching line between the HEV drive mode and the WSC drive mode, the WSC mode is set to be selected when in an area that is less than a predetermined accelerator opening degree APO1 and less than a predetermined vehicle speed VSP1 that is smaller than the idle speed of the engine E when the automatic transmission AT is the first gear. Further, regarding the switching line between the HEV drive mode and the WSC drive mode, the HEV mode is set to be selected when in an area that is greater than or equal to the predetermined accelerator opening degree APO1, since a great drive torque is required, and greater than or equal to a vehicle speed VSP1' that is higher than the lower limit vehicle speed VSP1. In addition, this drive mode change control is configured so that the WSC drive mode is selected when the battery SOC is low, even in a case of the vehicle start, since the EV drive mode cannot be achieved due to low battery charge.

In a case when the accelerator opening degree APO is large, it can be difficult to meet the request of the large accelerator opening degree APO when the drive torque is equal to an engine torque applied by engine E corresponding to the engine idle speed plus the torque applied by the motor-generator MG. Here, as the engine rpm increases, more drive torque can be output. For this reason, even if the WSC drive mode is carried out up to a higher vehicle speed than the lower limit vehicle speed VSP1, by increasing the engine rpm and outputting the greater drive torque, it is possible to change from the WSC drive mode to the HEV drive mode in a short time. This case corresponds to the WSC area that is extended up to the lower limit vehicle speed VSP1' in FIG. 5.

As for the MWSC mode map in FIG. 6, the EV drive mode is not set in the MWSC mode map, and the normal map is that the WSC drive mode area is not changed according to the accelerator opening degree APO but is instead set or defined by only the lower limit vehicle speed VSP1. In addition, the MWSC mode map sets the MWSC drive mode within a portion of the WSC drive mode area. The MWSC drive mode is set in an area defined by a predetermined vehicle speed VSP2 that is lower than the lower limit vehicle speed VSP1 and a predetermined accelerator opening degree APO2 that is higher than the predetermined accelerator opening degree APO1. It should be noted, however, that even if the MWSC mode is selected, the target mode is forcefully set to the WSC drive mode if the battery SOC is less than a predetermined value.

Figure 2:
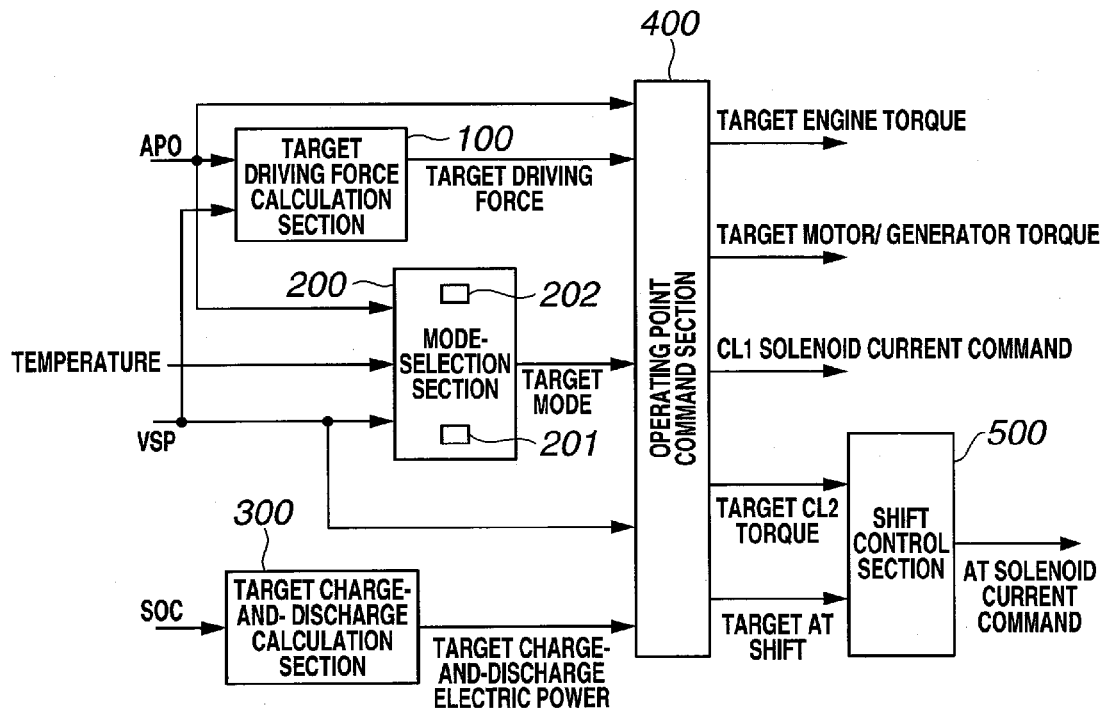
FIG. 2 is a control block diagram representing a calculation processing program in an integrated controller in the first embodiment.
Figure 7:
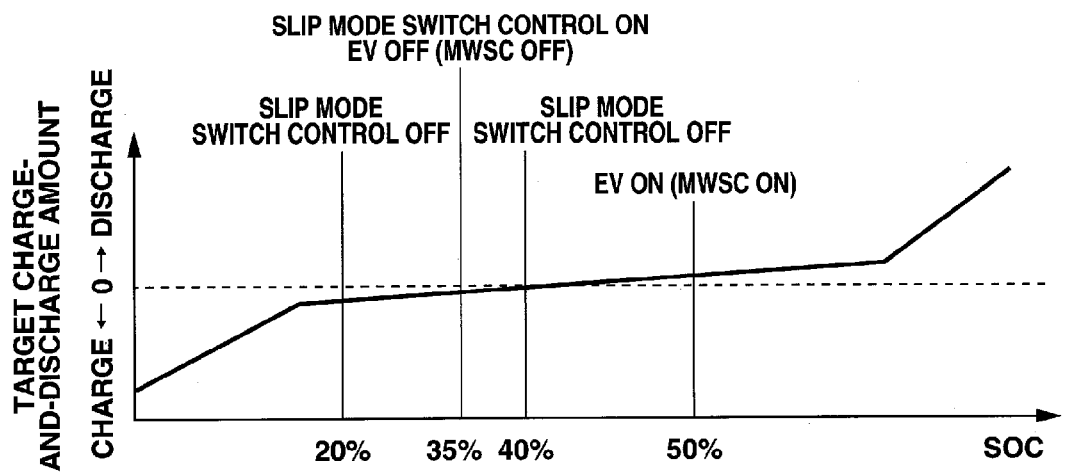
FIG. 7 is a diagram representing an example of a target charge-and-discharge electric power at a target charge-and-discharge calculation section shown in FIG. 2.

Referring to FIG. 2, the target charge-and-discharge operating section 300 computes a target charge-and-discharge power tP on the basis of the battery SOC by using a target charge-and-discharge amount map shown in FIG. 7. In the target charge-and-discharge amount map, an EV ON line (or an MWSC ON line) to allow or inhibit the EV mode or the MWSC drive mode is set to SOC=50%, and an EV OFF line (or an MWSC OFF line) is set to SOC=35%.

If SOC≧50%, an EV drive mode region appears in the normal mode map of FIG. 5 and, in the MWSC-capable mode map shown in FIG. 6, the MWSC drive mode region appears. Once the EV mode (shown in FIG. 5) or MWSC drive mode region (shown in FIG. 6) appears within the normal mode map or within the MWSC-capable mode map, this drive mode region continues to appear until the SOC is reduced and becomes below 35%.

If SOC<35%, the EV mode region disappears in the normal mode map shown in FIG. 5 and, in the same way as the EV mode region, the MWSC drive mode region disappears in the MWSC-capable mode map shown in FIG. 6. If the EV or MWSC drive mode region disappears from the mode map, they do not reappear until the SOC reaches 50%.

In addition, in the target charge-and-discharge amount map (shown in FIG. 7), a slip mode switch control ON line is set to SOC=35%, and the slip mode switch control OFF line is set to SOC=40% and to SOC=20%. It should be noted that the slip mode switch control is an alternate switch control between the EV mode and the WSC drive mode or an alternate switch control between the MWSC drive mode and the WSC drive mode. The details thereof are described later.

If SOC≧35%, the slip mode switch control is requested. If the SOC is reduced and becomes below 35%, the EV mode region (MWSC drive mode region) disappears in principle. However, during the execution of the slip mode switch control, the EV mode (or MWSC drive mode) is selected according to its necessity. When the slip mode switch control is requested, the selection of the EV mode (or the MWSC drive mode) based on the slip mode switch control is requested even if the SOC is reduced and falls below the EV OFF line and the EV mode region disappears from the corresponding mode map.

If SOC<20%, the slip mode switch control is inhibited. It is necessary to select either the EV mode or the MWSC drive mode properly. However, it is difficult for the hybrid vehicle to travel by the driving force only through motor-generator MG if the SOC is reduced below 20%. It should be noted that if SOC is reduced below 20%, the mode enters a fail mode for prompting the vehicle driver to perform the brake pedal depression operation (specifically including an illumination of a corresponding lamp, a vocal guidance, a display through a navigation system and so forth). If the SOC has reached the state that SOC=40% during the execution of a slip mode switch control, the slip mode switch control is terminated. At this time, the EV or MWSC drive mode based on the normal mode map is selected.

Referring back to FIG. 2, the operating point commanding section 400 calculates a transitional target engine torque, target motor-generator torque, target second clutch transmission torque capacity, a target shift stage of the automatic transmission AT and a first clutch solenoid current command on the basis of the accelerator opening degree APO, the target drive torque tFo0, the target mode, the vehicle speed VSP and the target charge-and-discharge power tP, as attainment targets of these operating points. Further, the operating point commanding section 400 also includes an engine start control section that starts the engine E when transitioning from the EV drive mode to the HEV drive mode.

The shift controller 500 drives and controls a solenoid valve in the automatic transmission AT to achieve the target second clutch transmission torque capacity and the target shift stage along a shift schedule shown in a shift map of the automatic transmission AT. Here, the target shift stage is preset in the shift map according to the vehicle speed VSP and the accelerator opening degree APO.

Next, details of the WSC drive mode are explained. The WSC drive mode is the state in which the engine E is maintained in the operated state and has a high response to a variation in the requested drive torque. More specifically, with the first clutch CL1 fully engaged, the slip control of the second clutch CL2 is executed as the transmission torque capacity TCL2 is varied according to the requested drive torque. The vehicle travels using the drive torque applied by the engine E and/or the motor-generator MG.

Since an element, such as a torque converter, which can absorb a difference in revolution speeds, is absent from the hybrid vehicle in the first embodiment, the vehicle speed is determined in accordance with the engine revolution speed of the engine E if the first clutch CL1 and the second clutch CL2 are fully engaged and the shift stage of the automatic transmission AT is fixed. In order to maintain the self-rotation of the engine E, a lower limit of the revolution speed according to the idling speed is present. The lower limit of the revolution speed becomes higher when a so-called idle-up operation is carried out during warm-up of the engine E. Furthermore, under conditions where the requested drive torque is high, rapid transition to the HEV drive mode cannot be completed.

On the other hand, in the EV drive mode, since the first clutch CL1 is disengaged, there is no lower limit associated with the above engine revolution speed. However, when traveling by the EV drive mode is made difficult due to a limit based on the battery SOC, or when the required drive torque cannot be attained by the motor-generator MG alone, a stable torque produced by the engine E is required to achieve the requested drive torque.

Therefore, at a low vehicle speed area where the vehicle speed is lower than the speed corresponding to the lower limit, where traveling in the EV drive mode is difficult, or where the requested drive torque cannot be attained by the motor-generator MG alone, the engine revolution speed is maintained at a predetermined lower limit revolution speed, the second clutch CL2 is slip-controlled, and the WSC drive mode is selected so that the vehicle travels using the engine torque according to the slip control of the second clutch CL2.

Figure 8A:
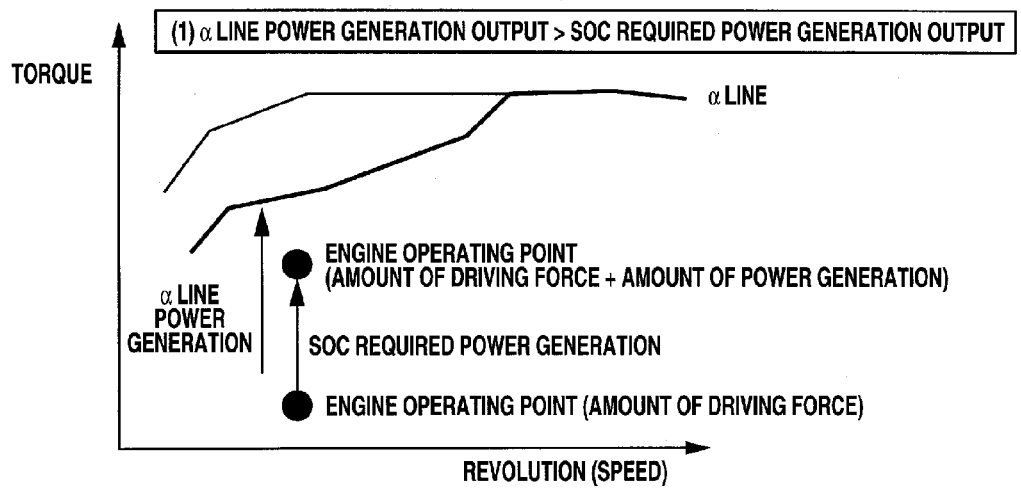
FIGS. 8A, 8B and 8C are schematic diagrams, each representing an engine operating point setting process in a WSC drive mode.
Figure 8B:
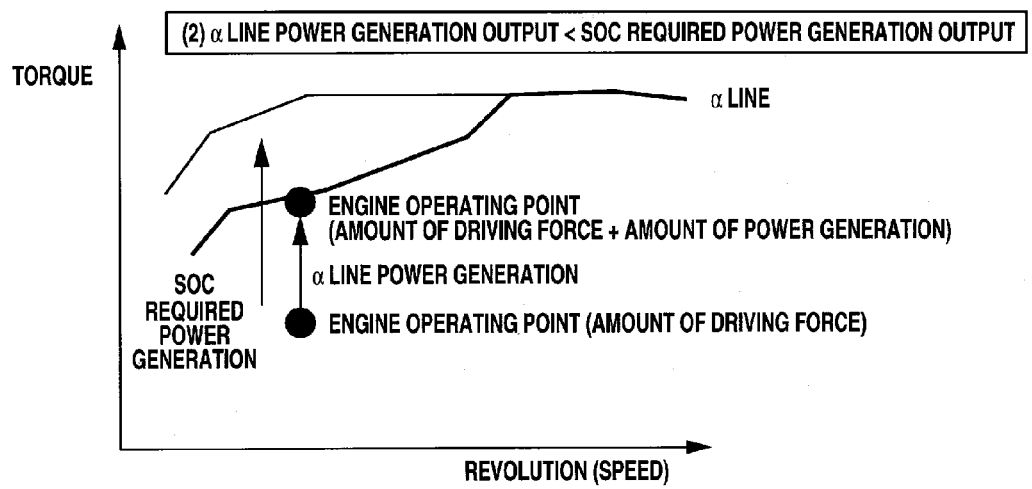
Figure 8C:
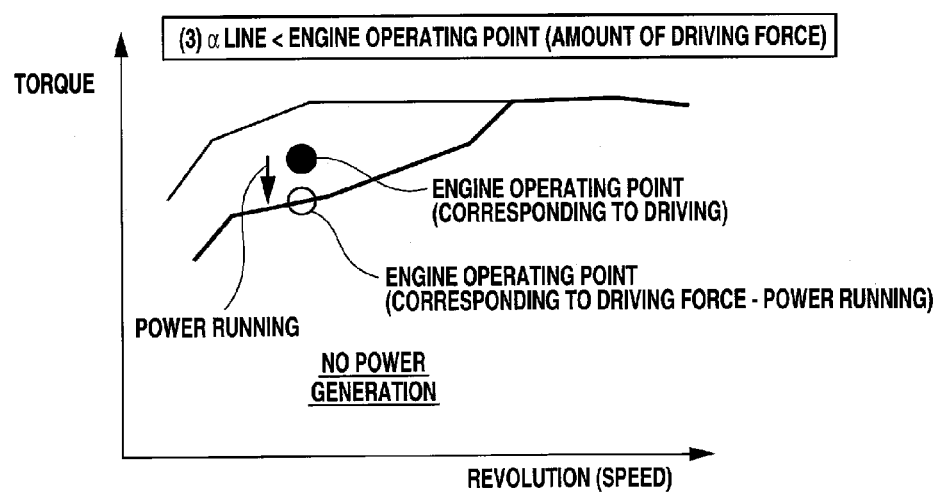
Figure 9:
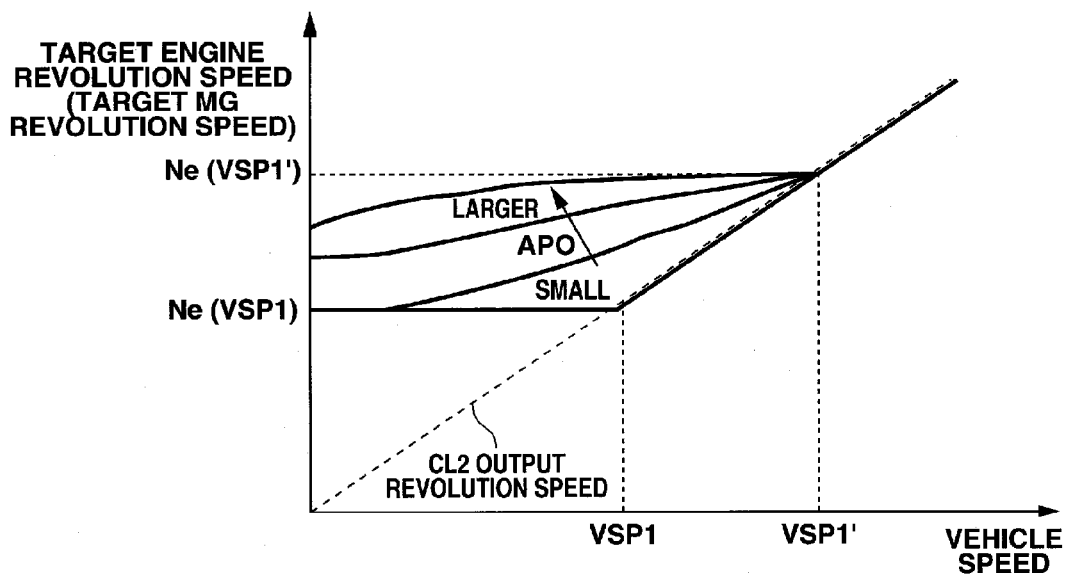
FIG. 9 is a map view representing a target engine speed in the WSC travel mode.
Figure 10:
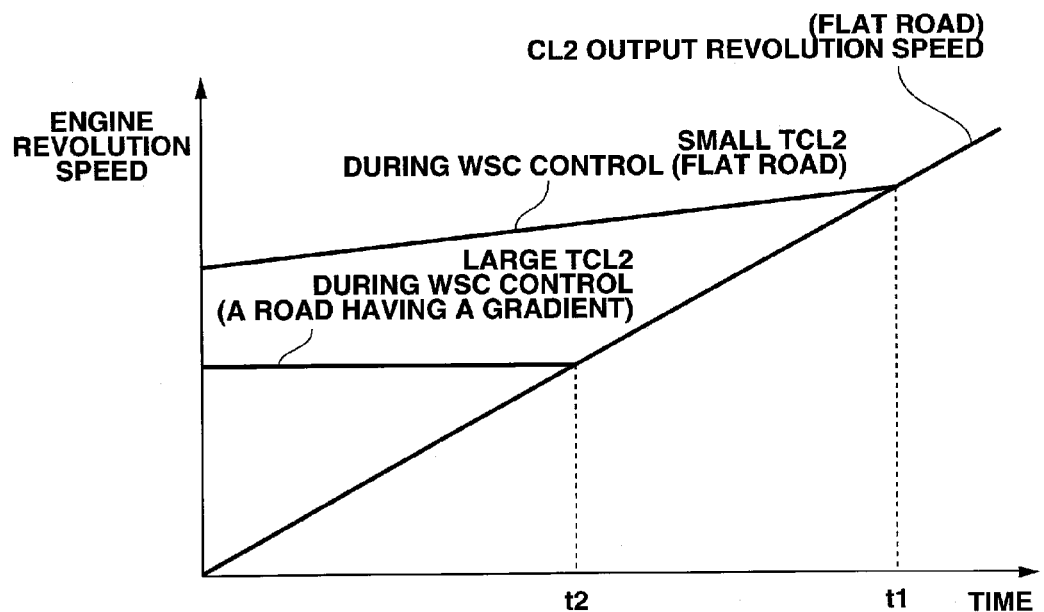
FIG. 10 is a timing chart representing a variation of an engine speed in the WSC travel mode.

FIGS. 8A, 8B and 8C are schematic graphs showing an engine operating point setting process in the WSC drive mode. FIG. 9 is a map showing the target engine revolution speed in the WSC drive mode.

In the WSC drive mode, when the driver operates the accelerator pedal, a target engine revolution speed characteristic according to an accelerator pedal opening degree APO is selected on the basis of the map in FIG. 9, and the target engine revolution speed according to the vehicle speed is set along this characteristic. By the engine operating point setting process in FIGS. 8A, 8B and 8C, the target engine torque corresponding to the target engine revolution speed is calculated.

Here, the operating point of the engine E is defined as a point that is determined by the engine revolution speed and the engine torque. As illustrated in FIGS. 8A, 8B and 8C, it is preferable that the operation point be executed along a line (hereinafter, an α line) connecting points of high output efficiency of engine E.

However, when the engine revolution speed is set in accordance with the driver's manipulation of the accelerator pedal opening degree (the required drive torque) as described above, the operating point deviates from the α line. Therefore, in order to bring the engine operating point closer to the α line in this case, the engine torque is feed-forward controlled to a value based on the α line.

On the other hand, a revolution speed feedback control is executed with the set engine revolution speed being the target revolution speed. Here, since the engine E and the motor-generator MG are in a directly connected state, the revolution speed of the engine E is also automatically feedback controlled by controlling the motor-generator MG to maintain the target revolution speed.

At this time, the torque output by the motor-generator MG is automatically controlled to compensate for a deviation of the target engine torque set on the basis of the α line from the required drive torque (a difference between the target engine torque set on the basis of the α line and the required drive torque). The motor-generator MG is provided with a basic or fundamental torque control amount (regeneration and power running) to compensate for the deviation and is further feedback controlled to become equal to the target engine revolution speed.

In a case where the required drive torque is smaller than a drive torque on the α line at a certain engine revolution speed, increasing an engine output torque increases engine output efficiency. At this time, by collecting or recapturing the energy corresponding to the increased output by the motor-generator MG, the torque itself that is input to the second clutch CL2 becomes the required drive torque, while permitting efficient electric power.

Since a torque upper limit is determined by the state of the battery SOC, it is desirable to consider a relationship of the magnitude between a required electric power generation output (SOC required generation power) determined by the battery SOC and a deviation (α line generation power) between the torque of a current operating point from the torque on the α line.

FIG. 8A is the schematic graph of the engine operating point setting process in the WSC drive mode in a case where the α line generation power is greater than or equal to the SOC required generation power. Since the engine output torque cannot be increased to be greater than or equal to the SOC required generation power, the operating point cannot be moved on the a line. However, by moving the operating point to a higher efficiency point, fuel efficiency can be improved.

FIG. 8B is the schematic graph of the engine operating point setting process in the WSC drive mode in a case where the α line generation power is smaller than the SOC required generation power. If the α line generation power is within a range of the SOC required generation power, the engine operating point can be moved on the α line. Thus, it is possible to generate the power while maintaining the operating point of a highest fuel efficiency.

FIG. 8C is the schematic graph of the engine operating point setting process in the WSC drive mode in a case where the engine operating point is higher than the α line. When the operating point according to the required drive torque is higher than the α line, the engine torque is lowered on the condition that there is a margin for the battery SOC, and the shortage is compensated by the power running of the motor-generator MG. With this operation, it is possible to attain the required drive torque while improving the fuel efficiency.

Next, a change of the WSC drive mode area according to the estimated increase gradient is explained. FIG. 9 is an engine revolution speed map when the vehicle speed is increased at a predetermined rate.

When the accelerator opening degree APO is greater than equal to the accelerator opening degree APO1 on a flat road, the WSC drive mode area is executed up to a vehicle speed that is higher than the lower limit vehicle speed VSP1. At this time, as shown in the map of FIG. 9, the target engine revolution speed is gradually increased with increasing vehicle speed. When reaching a speed corresponding to the vehicle speed VSP1', the slip-controlled state of the second clutch CL2 ceases since the second clutch CL2 becomes fully engaged, and the mode transitions to the HEV drive mode.

On an inclined road whose estimated incline gradient is greater than or equal to the predetermined values (g1 or g2), when trying to maintain the same vehicle speed increase state as the above operation, the accelerator opening degree APO becomes large. At this time, the second clutch transmission torque capacity TCL2 becomes large as compared with the flat road. If the WSC drive mode area is extended in this condition as shown in the map of FIG. 9, the second clutch CL2 is maintained in the slip-controlled state with a strong engagement force. Hence, there is a risk that an excessive amount of heat generation of the second clutch CL2 will be produced. Thus, in the MWSC-capable mode map in FIG. 6, which is selected in the case of the inclined road whose estimated gradient is great, the WSC drive mode area is not extended unnecessarily and is set up to the area corresponding to the lower limit vehicle speed VSP1. With this setting, overheating the second clutch in the WSC drive mode is avoided.

Next, the reason why the MWSC drive mode area is set is explained. In the case where the estimated gradient is greater than or equal to the predetermined gradients (g1 or g2), for instance, when trying to maintain the vehicle in the stop state or a slightly starting state (slight vehicle speed traveling state) without using the brake pedal operation, a large drive torque is required as compared with the flat road. This is because there is a need to maintain the vehicle against the weight load of the gross vehicle weight.

From the viewpoint of avoiding the heat generation caused by the slip of the second clutch CL2, the EV drive mode may be selected when there is the margin for the battery SOC. In this case, when the mode transitions from the EV drive mode to the WSC drive mode, the engine start is needed. Since the motor-generator MG outputs the drive torque while securing the torque for the engine start, a drive torque upper limit is lessened.

Furthermore, when the torque is output to only the motor-generator MG and the rotation of the motor-generator MG is stopped or is set to an extremely low revolution speed while in the EV drive mode, a lock current flows to a switching element of the inverter 3 (a phenomenon in which the current continues to flow to one element or device). As a result, there is a possibility that durability of the inverter 3 will be deteriorated.

Further, at the area (the area less than that of predetermined vehicle speed VSP2 in FIG. 6) that is lower than the lower limit vehicle speed VSP1, which corresponds to the idle speed of the engine E when the automatic transmission AT is the first speed, the revolution speed of the engine E itself cannot be reduced to be lower than the idle speed. At this time, when selecting the WSC drive mode, there is a risk that the slip amount of the second clutch CL2 is great, which could reduce the durability of the second clutch CL2.

Especially on the inclined road, since the large drive torque is required as compared with the flat road, the second clutch transmission torque capacity TCL2 required becomes high, and the state of the high slip amount with the high torque is maintained. This tends to cause the deterioration of the durability of the second clutch CL2. In addition, since the increase of the vehicle speed is gradual, a greater amount of time to transition to the HEV drive mode is needed, and there is a possibility that the heat will be further generated by the second clutch CL2.

Thus, the MWSC drive mode is selected in which the first clutch CL1 is released while the engine E is operating, and the revolution speed (rpm) of the motor-generator MG is feedback controlled to reach a target revolution speed higher than an output revolution speed of the second clutch CL2 by a predetermined revolution speed. This occurs while the second clutch transmission torque capacity TCL2 is being controlled to the driver's required drive torque.

The second clutch CL2 is slip-controlled while the rotation state of the motor-generator MG is being set to a revolution speed that is lower than the idle speed of the engine E. At the same time, the control of the engine E is switched to the feedback control with the idle speed set as the target revolution speed. In the WSC drive mode, the engine revolution speed is maintained by the revolution speed feedback control of the motor-generator MG. On the other hand, when the first clutch CL1 is released, the engine revolution speed cannot be controlled by the motor-generator MG to be the idle speed. Therefore, an engine revolution speed feedback control is executed by the engine E itself.

With the setting of the MWSC drive mode area, the following advantages can be achieved.

Since the engine E is operating, it is not necessary for the motor-generator MG to secure the torque required to start the engine, and the drive torque upper limit of the motor-generator MG can be large. More specifically, the MWSC drive mode can respond to the higher required drive torque as compared with the EV drive mode.

By securing the rotation state of the motor-generator MG, the durability of the switching elements of the inverter 3 can be improved.

Since the motor-generator MG rotates at a revolution speed that is lower than the idle speed of the engine E, it is possible to reduce the slip amount of the second clutch CL2. Thus, the durability of the second clutch CL2 can be improved.

Figure 11:
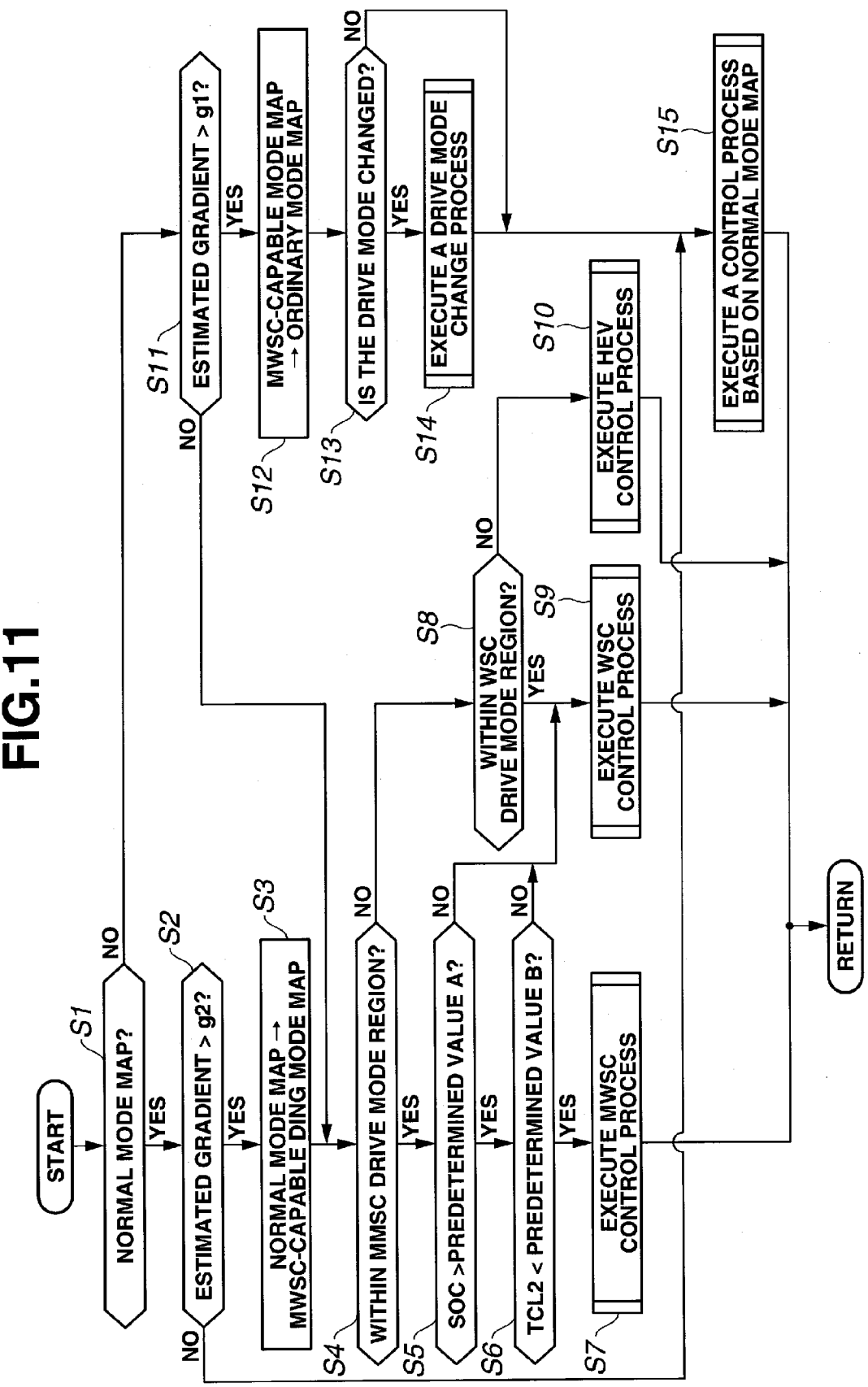
FIG. 11 is a flowchart representing a travel control process in a map switching process and in an MWSC-capable mode map selection.

Next, a map change process and a drive control process when selecting the MWSC-capable mode map is explained with reference to a flow chart in FIG. 11.

At step S1, the integrated controller 10 determines whether the normal mode map is selected. If the normal mode map is selected (YES), the routine proceeds to step S2. If the normal mode map is not selected, but the MWSC-capable mode map is selected (NO), the routine proceeds to step S11.

At step S2, the integrated controller 10 determines whether the estimated road incline gradient is greater than the predetermined value g2. If the estimated road incline gradient is greater than to the predetermined value g2 (YES), the routine proceeds to step S3. If the estimated road incline gradient is less than or equal to the predetermined value g2 (NO), the routine proceeds to step S15, where the control process based on the normal mode map is carried out.

At step S3, the integrated controller 10 switches the mode map from the normal mode map to the MWSC-capable mode map.

At step S4, the integrated controller 10 determines whether the operating point determined by the current accelerator opening degree APO and the vehicle speed VSP is in the MWSC drive mode area. If the operating point is determined to be in the MWSC drive mode area (YES), the routine proceeds to step S5. If the operating point is determined to be outside the MWSC drive mode area (NO), the routine proceeds to step S8.

At step S5, the integrated controller 10 determines whether the battery SOC is greater than a predetermined value A. If the battery SOC is greater than the predetermined value A (YES), the routine proceeds to step S6. If the battery SOC is less than or equal to the predetermined value A (NO), the routine proceeds to step S9. Here, the predetermined value A is a threshold value for judging whether or not the drive torque can be secured by only the motor-generator MG. When the battery SOC is greater than to the predetermined value A, the drive torque can be secured by the motor-generator MG alone. When the battery SOC is smaller than or equal to the predetermined value A, the MWSC drive mode will be prevented from being selected since the charge of the battery 4 is needed.

At step S6, the integrated controller 10 determines whether the second clutch transmission torque capacity TCL2 is less than a predetermined value B. If the second clutch transmission torque capacity TCL2 is less than the predetermined value B (YES), the routine proceeds to step S7. If the second clutch transmission torque capacity is greater than or equal to the predetermined value B (NO), the routine proceeds to step S9. Here, the predetermined value B is a predetermined value that indicates that no excess current flows to the motor-generator MG. Since the rotation of the motor-generator MG is controlled, the torque produced at the motor-generator MG becomes greater than or equal to a load that acts on the motor-generator MG.

That is, since the rotation of the motor-generator MG is controlled to bring the second clutch CL2 into the slip state, a larger torque than the second clutch transmission torque capacity TCL2 is produced at the motor-generator MG. Thus, when the second clutch transmission torque capacity TCL2 of the second clutch CL2 is too large, the current flowing to the motor-generator MG becomes too large, and the durability of the switching elements of the inverter 3 deteriorates. In order to avoid this state, when the second clutch transmission torque capacity TCL2 is greater than or equal to the predetermined value B, the selection of the MWSC drive mode is prevented from being selected.

At step S7, an MWSC control process is executed. More specifically, the first clutch CL1 is released while the engine E is in the operated state, and the engine E is feedback controlled so that the revolution speed of the engine E becomes the idle speed. Further, the motor-generator MG is feedback controlled so that the revolution speed of the motor-generator MG becomes a target revolution speed (but, lower than the idle speed of the engine E) that is set by adding a predetermined revolution speed $\alpha$ to an output side revolution speed Ncl2out of the second clutch CL2. Finally, the second clutch CL2 is feedback controlled so that the second clutch transmission torque capacity TCL2 is provided according to the required drive torque. Here, since the MWSC drive mode is not set in the normal mode map, the transition from the EV drive mode or from the WSC drive mode to the MWSC drive mode is included in the MWSC control process at step S7.

At step S8, the integrated controller 10 determines whether the operating point determined by the current accelerator opening degree APO and the vehicle speed VSP is in the WSC drive mode area. If the operating point is determined to be in the WSC drive mode area (YES), the routine proceeds to step S9. If the operating point is determined to be outside of the WSC drive mode area (NO), the operating point is determined to be in the HEV drive mode area, and the routine proceeds to step S10.

At step S9, a WSC control process is executed. Specifically, the first clutch CL1 is fully engaged, and the engine E is feed-forward controlled in accordance with the target drive torque, the motor-generator MG is feedback controlled so that the revolution speed of the motor-generator MG becomes the idle speed, and the second clutch CL2 is feed-forward controlled so that the second clutch transmission torque capacity TCL2 becomes the required drive torque. Here, since the EV drive mode is not set in the MWSC-capable mode map, the mode transition from the EV drive mode is included in the WSC control process at step S9.

At step S10, the HEV control process is executed. More specifically, the first clutch CL1 is completely engaged, and the engine E and the motor-generator MG are feed-forward controlled so that the engine E and the motor-generator MG produce the torque according to the required drive torque. The second clutch CL2 is completely engaged. Here, since the EV drive mode is not set in the MWSC-capable mode map, the transition from the EV drive mode is included in the HEV control process at step S10.

At step S11, the integrated controller 10 determines whether the estimated road incline gradient is less than or equal to the predetermined value g1. If the estimated road incline gradient is determined to be less than or equal to the predetermined value g1 (YES), the routine proceeds to step S12. If the road incline gradient is determined to be greater than the predetermined value g1 (NO), the routine proceeds to step S4, and control according to the MWSC-capable mode map is continued.

At step S12, the integrated controller 10 switches the mode map from the MWSC-capable mode map to the normal mode map.

At step S13, the integrated controller 10 determines whether the drive mode is changed as a result of the map change. If the drive mode has changed (YES), the routine proceeds to step S14. If the drive mode is determined to be the same after the map change (NO), the routine proceeds to step S15. This step is performed because a change from the MWSC drive mode to the WSC drive mode, a change from the WSC drive mode to the EV drive mode and a change from the HEV drive mode to the EV drive mode could occur when changing the map from the MWSC-capable mode map to the normal mode map.

At step S14, the integrated controller 10 executes a drive mode change process. More specifically, during the mode transition from the MWSC drive mode to the WSC drive mode, the target revolution speed of the motor-generator MG is changed to the idle speed of the engine E, and the first clutch CL1 is engaged when the revolution speeds of the motor-generator MG and the engine E become synchronized. Then, the revolution speed control of engine E is changed from the idle speed feedback control to the target engine torque feedforward control.

When the mode transition is made from the WSC drive mode to the EV drive mode, the first clutch CL1 is disengaged, the engine E is stopped, the revolution speed control of the motor-generator MG is switched to the torque control based on the required drive torque, and the control of the second clutch CL2 is switched from the feedback control based on the required drive torque to complete engagement.

When the mode transition is made from the HEV drive mode to the EV drive mode, the first clutch CL1 is released, the engine E is stopped, the torque control based on the required drive torque of the motor-generator MG is continued, and the control of the second clutch CL2 is switched from the feedback control based on the required drive torque to becoming completely engaged.

At step S15, the integrated controller 10 executes the control process based on the normal mode map.

Next, the slip mode switch process is described below. As described above, while the EV mode is selected, second clutch CL2 is maintained in complete engagement or is controlled in a very small slip state. Thus, the heat generation of second clutch CL2 is negligible. In addition, during the vehicle travel on the incline having the large road incline gradient, accelerator pedal opening degree APO is relatively large (the accelerator pedal is deeply depressed) at such an extremely low vehicle speed as in an accelerator hill hold that there is a possibility of exceeding the EV drive mode region. As a countermeasure, the road incline gradient is detected. Then, when the road surface gradient is larger than a predetermined value (g1 or g2), the drive mode is switched to the MWSC drive mode. Thus, the MWSC drive mode is selected over a relatively wide range, and second clutch CL2 is controlled in a very small slip state.

In either case, either the EV or MWSC drive mode region appears or disappears within the normal mode map or the MWSC-capable mode map according to the SOC, as explained in FIG. 7. That is to say, the WSC drive mode or the EV or MWSC drive mode is selected on a basis of the SOC, irrespective of the temperature of second clutch CL2.

Figure 12:
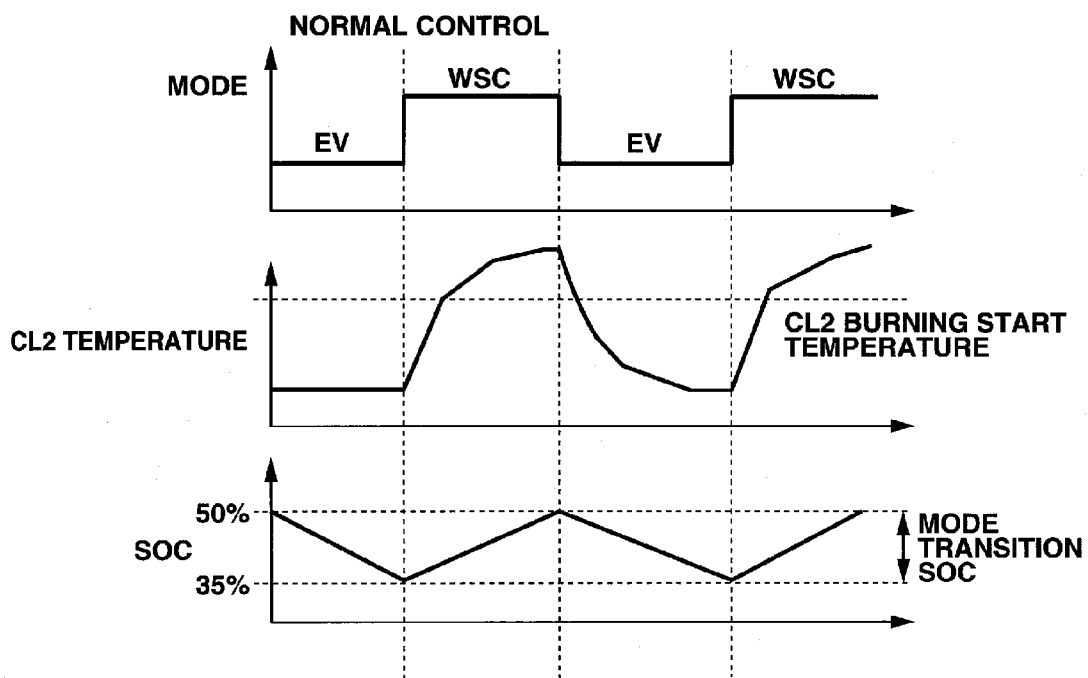
FIG. 12 is a timing chart representing a situation under which an EV mode and the WSC travel mode are alternately selected in accordance with a SOC (State-Of-Charge) in a normal control.
Figure 13:
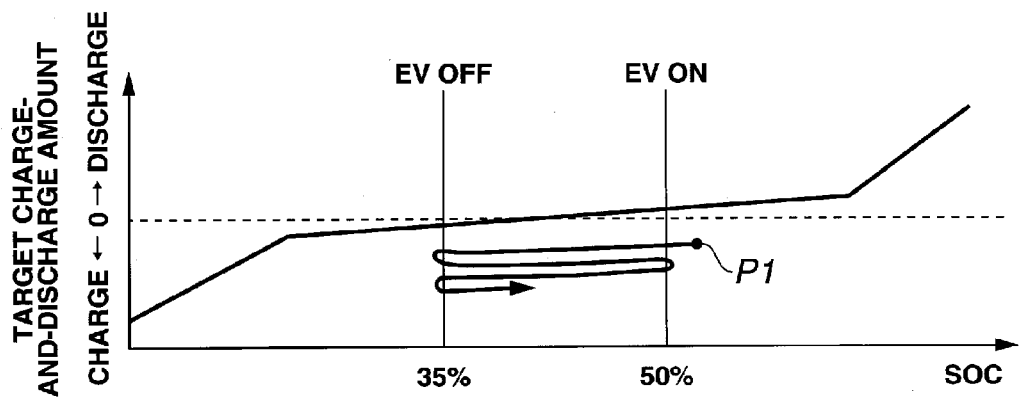
FIG. 13 is a schematic diagram of a target charge-and-discharge amount map on which motion of the SOC in the timing chart shown in FIG. 21 is depicted.

FIG. 12 is a timing chart representing a situation in which the EV mode or the WSC drive mode is selected irrespective of the temperature of second clutch CL2. FIG. 13 is a graph in which motion of SOC is depicted in the target charge-and-discharge amount map shown in FIG. 12.

As shown in FIG. 12, if a state in which the SOC is larger than 50% while operating in the EV mode, the SOC is gradually reduced. As shown in FIG. 13, a point P1 gradually moves left within the graph. Then, if the SOC is smaller than 35%, namely, the SOC is reduced and becomes smaller than an EV OFF line, the EV mode region disappears from the normal mode map. Hence, the mode is forcefully switched to the WSC drive mode.

In the WSC drive mode, a request for electric power generation is simultaneously carried out to recover the SOC (refer to FIGS. 7, 8A, 8B and 8C), and the SOC starts to recover. As viewed in FIG. 13, point P1 gradually moves to the right within the graph. However, in the WSC drive mode, the amount of slippage of second clutch CL2 is large so that the temperature of second clutch CL2 rapidly increases.

At this time, until the SOC is in excess of 50%, namely, the SOC is increased and becomes larger than an EV ON line, the WSC drive mode is forcefully selected. The temperature of second clutch CL2 is often in excess of a burning start temperature. It should be noted that the burning start temperature is a temperature at which second clutch CL2 becomes excessively hot and there is a possibility of melting second clutch CL2 when the slip state is ended. The value is appropriately set based on specifications and experiments.

That is, as shown in FIG. 13, the SOC is controlled to oscillate between EV ON line and EV OFF line. Between these lines, a temperature variation of second clutch CL2 exceeds the burning start temperature, and thus the durability of second clutch CL2 is diminished.

Therefore, in place of the normal control to switch between the WSC drive mode and the EV or MWSC drive mode according to the SOC, a slip mode switch control is introduced in which the WSC drive mode and the EV mode or the MWSC drive mode is switched in accordance with temperature TempCL2 of second clutch CL2.

Figure 14:
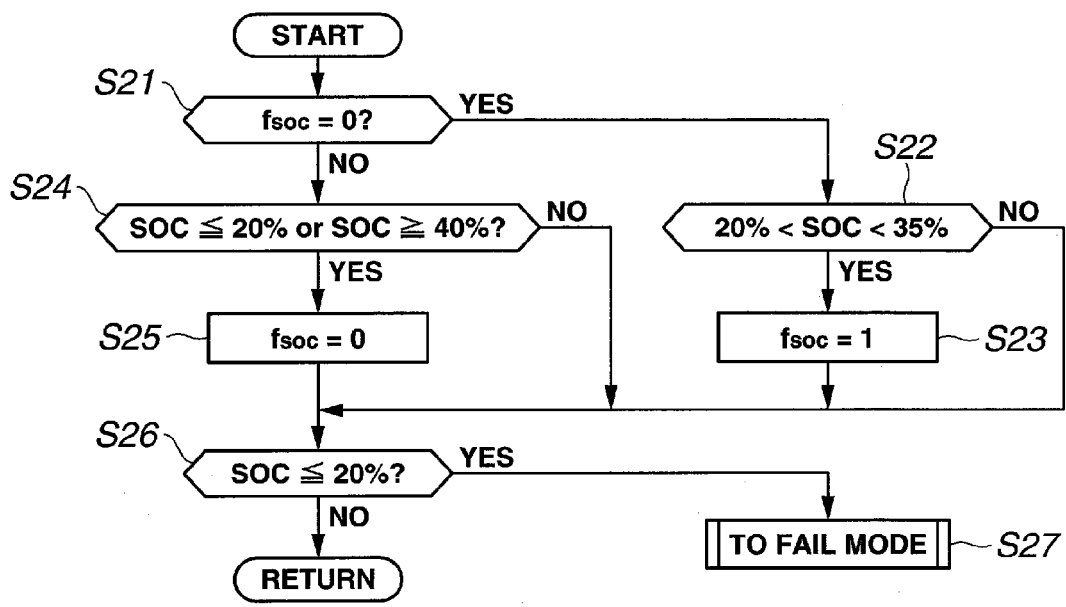
FIG. 14 is a flowchart presenting a slip mode switch control process.
Figure 15:
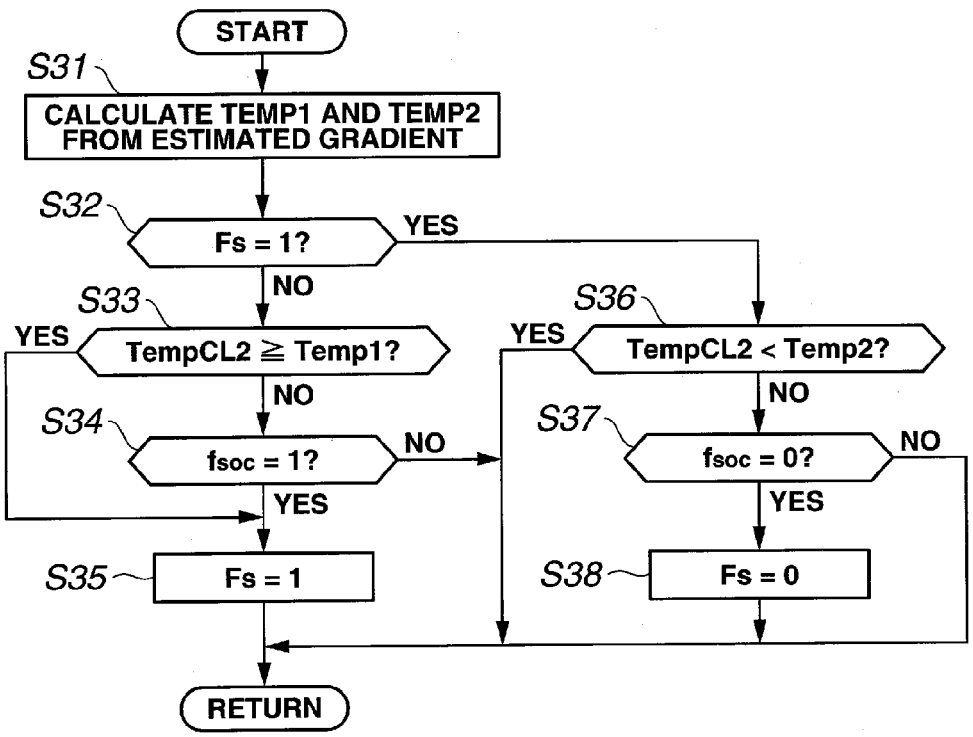
FIG. 15 is another flowchart presenting the slip mode switch control process.
Figure 16:
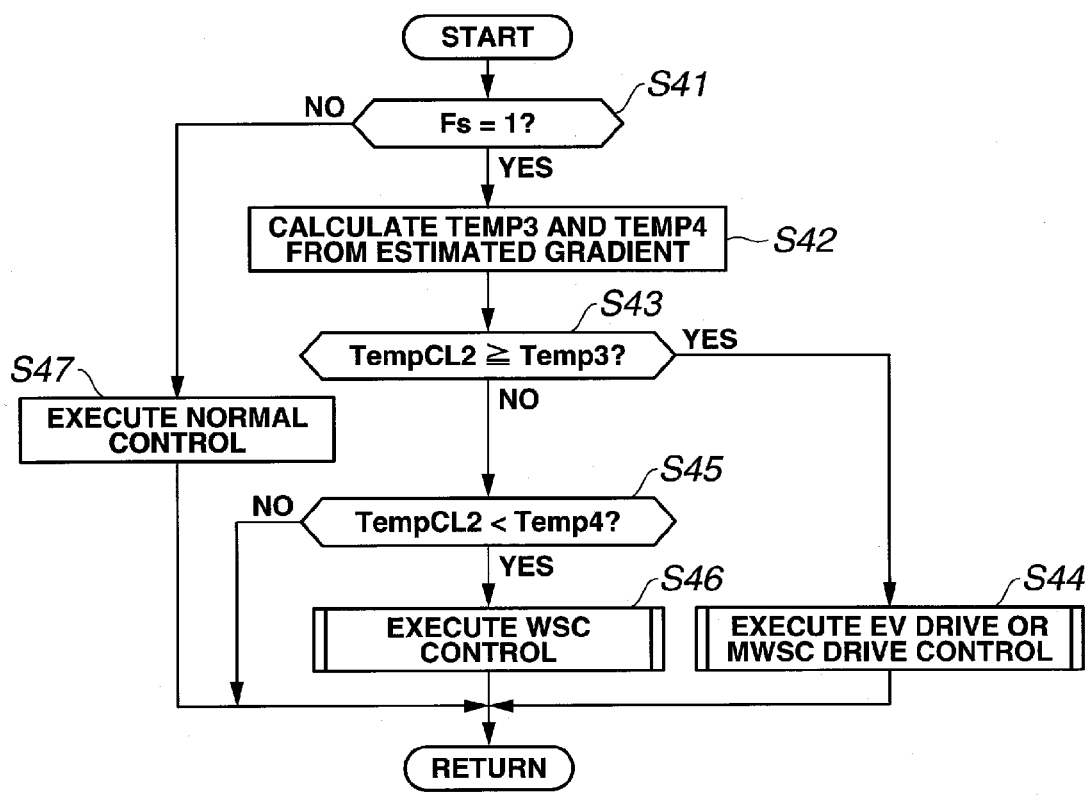
FIG. 16 is a still another flowchart presenting the slip mode switch control process.

FIGS. 14 through 16 show flowcharts representing the slip mode switch control.

First, a slip mode switch control request flag setting process based on the SOC is described using the flowchart of FIG. 14. This flag is set to allow the EV drive mode or MWSC drive mode in the range of the SOC different from the range of SOC in the EV drive mode or the MWSC drive mode in the normal control.

At step S21, integrated controller 10 determines whether an SOC side slip mode switch control request flag fsoc is "0" or not. If the slip mode switch control request flag fsoc is "0" at step S21 (YES), the routine goes to step S22. If the slip mode switch control request flag fsoc is not "0" at step S21 (NO), the routine goes to step S24.

At step S22, integrated controller 10 determines whether the SOC is larger than 20% and is smaller than 35%. If the SOC is within this range (YES) at step S22, the routine goes to step S23. If the SOC is not within this range (NO) at step S22, the routine goes to step S26.

At step S23, integrated controller 10 sets SOC side slip mode switch control request flag fsoc to "1".

At step S24, integrated controller 10 determines whether the SOC is equal to or smaller than 20% or the SOC is equal to or larger than 40%. If the SOC is within this range (YES) at step S24, the routine goes to step S25. If the SOC is not within this range (NO) at step S24, the routine goes to step S26.

At step S25, SOC side slip mode switch control request flag fsoc is set to "0".

At step S26, integrated controller 10 determines whether the SOC is equal to or smaller than 20%. If the SOC is equal to or smaller than 20% (YES) at step S26, the routine goes to step S27, in which a fail mode is carried out. The fail mode is an operation to promote a depression operation of the brake pedal to the vehicle driver. In this case, the slip mode switch control itself is terminated. Otherwise, this control flow of FIG. 14 is ended.

Figure 17:
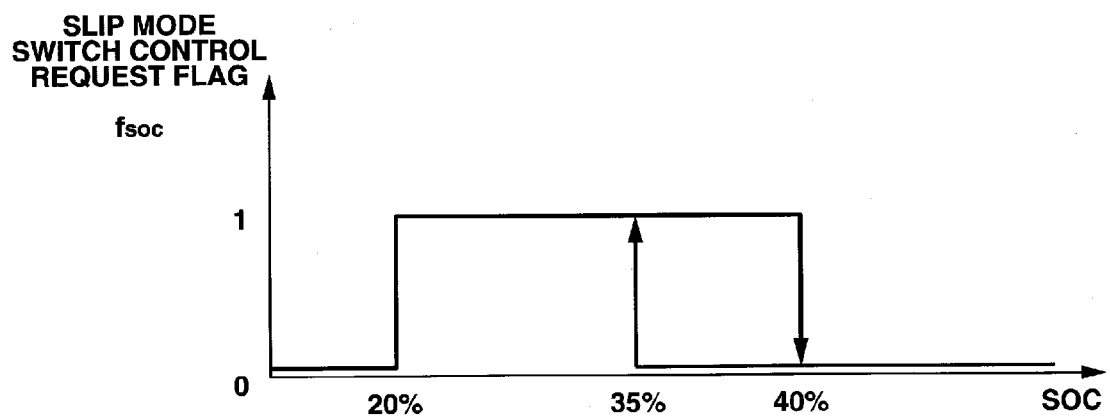
FIG. 17 is a diagram representing a relationship between an SOC and a slip mode switch control request flag fsoc.

FIG. 17 is a diagram representing a relationship between the SOC and slip mode switch control request flag fsoc. As shown in FIG. 17, when fsoc is set to "1", a hysteresis between 35% (ON line) and 40% (OFF line) is provided. When the SOC is reduced and becomes smaller than 20%, fsoc is immediately set to "0".

Next, the slip mode switch control request flag setting process based on temperature TempCL2 of second clutch CL2 is described with reference to FIG. 15. This flag is a flag set to determine whether temperature TempCL2 of second clutch CL2 falls within a predetermined temperature range required to protect the second clutch CL2.

Figure 18:
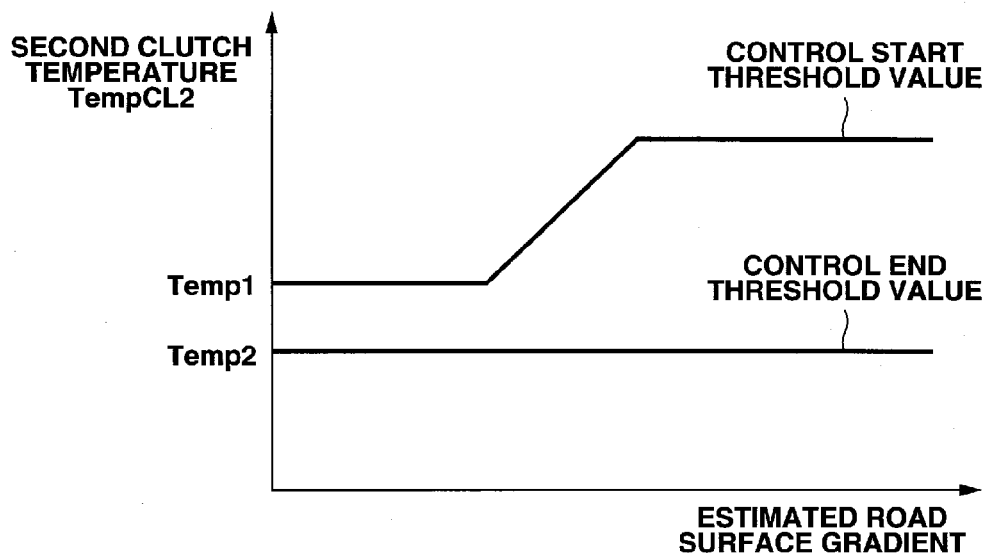
FIG. 18 is a map view representing a slip mode switch control temperature setting map.

At step S31, integrated controller 10 sets both of a control start threshold value Temp1 and a control end threshold value Temp2 from the estimated road incline gradient on a basis of the slip mode switch control temperature setting map shown in FIG. 18. It should be noted that control start threshold value Temp1 and control end threshold value Temp2, both being shown in FIG. 18, are set to provide a large difference between control start threshold value Temp1 and control end threshold value Temp2 when the road incline gradient is larger. That is, during the travel of the vehicle on the large road incline gradient, the temperature of second clutch CL2 rises fast and the switching period of the drive mode becomes short. In addition, the difference between control start threshold value Temp1 and control end threshold value Temp2 becomes larger. Similarly, a switching period between drive modes is within a range to avoid causing discomfort to the vehicle driver.

At step S32, integrated controller 10 determines whether a slip mode switch control request flag Fs is set to "1". If set to "0" (NO) at step S32, the routine goes to step S33. If set to "1" (YES) at step S32, the routine goes to step S36.

At step S33, integrated controller 10 determines whether temperature TempCL2 of second clutch CL2 is equal to or higher than control start threshold value Temp1. If TempCL2 is equal to or higher than control start threshold value Temp1 (YES) at step S33, the routine goes to step S35. If TempCL2 is not equal to or higher than Temp1 (NO) at step S33, the routine goes to step S34.

At step S34, integrated controller 10 determines whether the SOC side slip mode switch control start request flag fsoc is set to "1". If fsoc is set to "1" at step S34 (YES), the routine goes to step S35. Otherwise, the present control flow is ended, and temperature side slip mode switch control start request flag Fs is maintained as "0".

At step S35, temperature side slip mode switch control start request flag Fs is set to "1".

At step S36, integrated controller 10 determines whether temperature TempCL2 of second clutch CL2 is lower than control end threshold value Temp2. If temperature TempCL2 is lower than control end threshold value Temp2 (YES), the routine goes to step S37. If temperature TempCL2 is equal to or higher than control end threshold value Temp2 (NO) at step S36, the present control flow is ended, and temperature side slip mode switch control start request flag Fs is maintained as "1".

At step S37, integrated controller 10 determines whether slip mode switch control request flag fsoc is set to 0 or not. If fsoc is set to "0" (YES) at step S37, the routine goes to step S38. Otherwise, the present control flow is ended, and temperature side slip mode switch control start request flag Fs is maintained as "1".

That is, in a case where either one of SOC side slip mode switch control request or temperature side slip mode switch control request is issued, the corresponding request of the slip mode switch control request is outputted. During the accelerator hill hold drive of the vehicle when the vehicle travels on a road having a large road incline gradient, the MWSC drive mode is selected. In this case, the slip mode switch control is requested on a basis of the SOC condition without a rise in temperature TempCL2 of second clutch CL2. The WSC drive mode is continuously selected during the travel of the vehicle on the flat road and temperature TempC12 of second clutch CL2 is raised. Hence, the protection of second clutch CL2 is needed.

On the other hand, when, at the end of the slip mode switch control, both of the SOC side slip mode switch control request and the temperature side slip mode switch control request are released, the corresponding request of the slip mode switch control is released. For example, during the execution of slip mode switch control, the consumption of the SOC is small as compared with the normal EV or the MWSC drive mode. It is possible to recover the SOC when the vehicle runs on the WSC drive mode. At this time, when the request of the temperature side slip mode switch control is released, the release of the SOC side slip mode switch control request is not made. This is because it is still necessary to recover the SOC according to the slip mode switch control.

Thus, when temperature side slip mode control request flag Fs is set, the value of the SOC side slip mode control request flag fsoc is set to correspond to the temperature side slip mode control request flag Fs. When either one of the requests is made, a temperature side slip mode switch control request flag Fs is set to "1" to indicate that the slip mode switch control request is present.

Next, a control selection process in the slip mode switch control is described with reference to a flowchart of FIG. 16.

At step S41, integrated controller 10 determines whether slip mode switch control request flag Fs is set to "1". If this flag Fs is set to "1" (YES) at step S41, the routine goes to step S42. If Fs is not set to "1" (NO) at step S41, the routine goes to step S47, at which the normal control is executed. This normal control at step S47 is control using the target charge-and-discharge amount map or the normal mode map.

Figure 19:
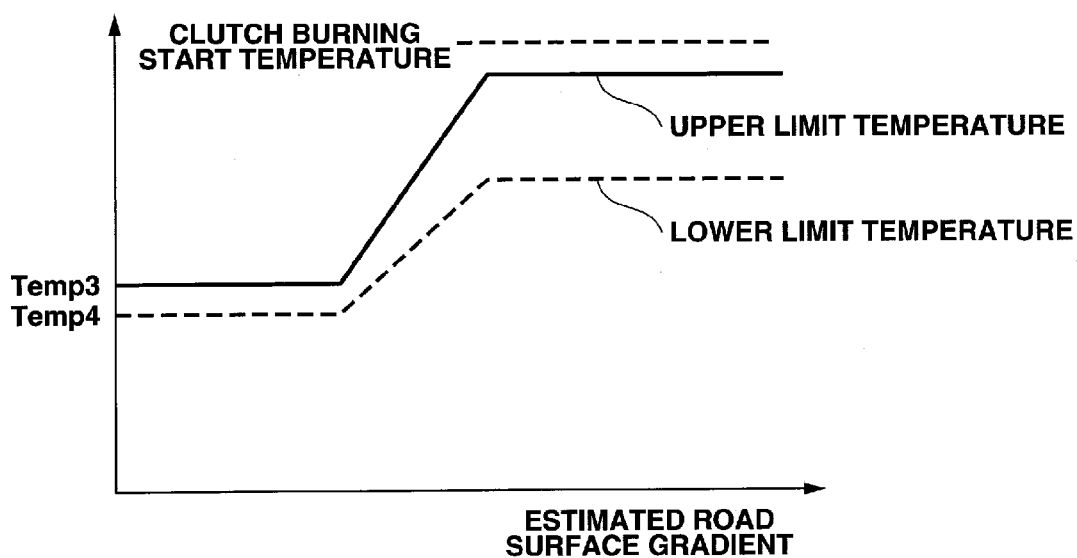
FIG. 19 is a slip mode switch control end temperature setting map.

At step S42, integrated controller 10 sets an upper limit temperature Temp3 and a lower limit temperature Temp4. At both of upper limit temperature Temp3 and lower limit temperature Temp4, the control is switched on a basis of the estimated road incline gradient by referring to the slip mode switch control end temperature setting map shown in FIG. 19. It should be noted that each of upper limit temperature Temp3 and lower limit temperature Temp4 is set to become higher as the estimated road incline gradient becomes larger, and a difference of upper and lower limit temperatures Temp3 and Temp4 is set to become large when the estimated road incline gradient becomes large. It should be noted that upper limit temperature Temp3 is set at a temperature lower than the clutch burning start temperature.

That is, during the vehicle run of an ascending incline having a large road incline gradient, the speed of the temperature rise of second clutch CL2 is fast, the switching period of the drive mode becomes short, and the vehicle driver will become uncomfortable. In addition, upper limit temperature Temp3 and lower limit temperature Temp4 are set such that the difference between upper limit temperature Temp3 and lower limit temperature Temp4 becomes larger. Similarly, the switching period of the drive mode is in a range to prevent the vehicle driver from feeling discomfort.

Figure 20:
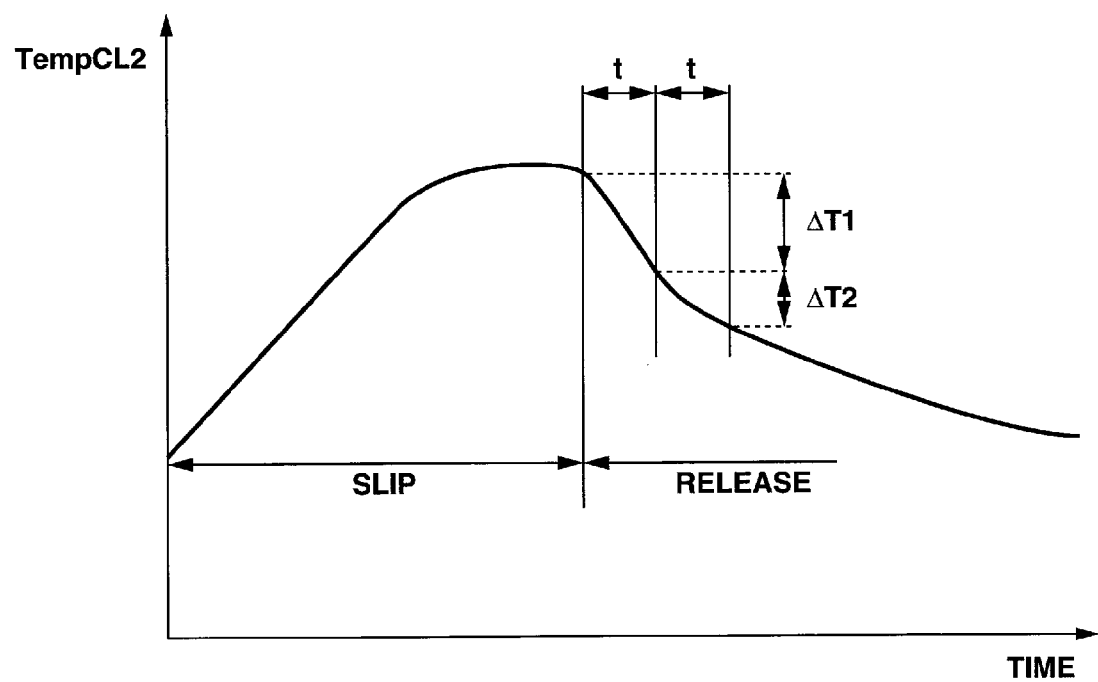
FIG. 20 is a diagram representing a temperature variation characteristic of the second clutch.

In addition, lower limit temperature Temp4 is raised to improve a temperature lowering efficiency. FIG. 20 shows a graph representing a temperature variation characteristic of the temperature TempCL2 of the second clutch CL2. In a case where the slip state of second clutch CL2 ceases and the second clutch CL2 becomes disengaged, the temperature TempCL2 of the second clutch CL2 is decreased by an amount ΔT1 over a predetermined amount of time t. Also, the temperature TempCL2 is further decreased by an amount ΔT2, which is less than ΔT1, over another period of predetermined time t. As described above, with the temperature decreasing characteristic of second clutch CL2 during the disengagement of second clutch CL2, it is advantageous to employ the temperature decreasing characteristic when the rate of decrease of the temperature TempCL2 can be large.

The decrease of the temperature TempCL2 is caused by the drive of motor-generator MG, namely, the battery power. Since the temperature decrease can be achieved using the battery power in an efficient manner, an efficient cooling can be achieved only when a large rate of decrease of the temperature can be achieved.

At step S43, integrated controller 10 determines whether temperature TempCL2 of second clutch CL2 is equal to or higher than upper limit temperature Temp3. If temperature TempCL2 of second clutch CL2 is equal to or higher than upper limit temperature Temp3 (YES) at step S43, the routine goes to step S44. If temperature TempCL2 is less than upper limit temperature Temp3 (NO) at step S43, the routine goes to step S45.

At step S44, integrated controller 10 selects either the EV mode or the MWSC drive mode. It should be noted that either mode will be selected according to the estimated road incline gradient (refer to FIG. 4).

At step S45, integrated controller 10 determines whether temperature TempCL2 of second clutch CL2 is lower than lower limit threshold value Temp4. If temperature TempCL2 of second clutch CL2 is lower than lower limit threshold value Temp4 (YES) at step S45, the routine goes to step S46. Otherwise, the present control flow of FIG. 16 is ended, and the present drive mode is maintained.

At step S46, the WSC drive mode is selected.

Figure 21:
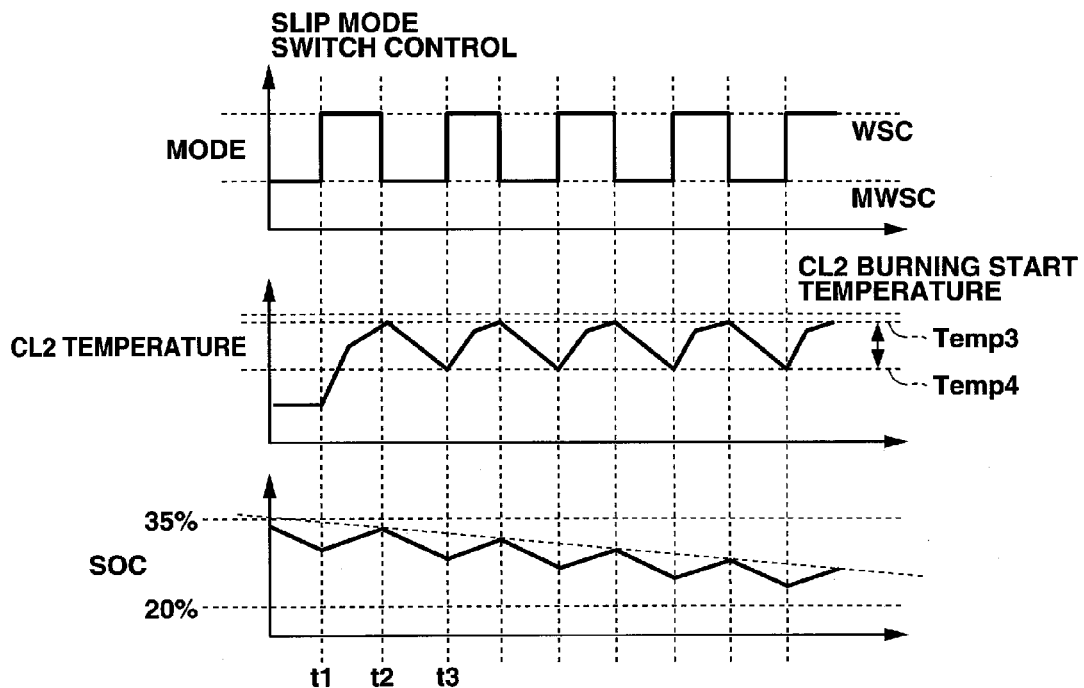
FIG. 21 is a timing chart representing a slip mode switch control in a case where an accelerator hill hold is executed on a gradient (slope) road having an estimated road gradient which is equal to or larger than a predetermined value.
Figure 22:
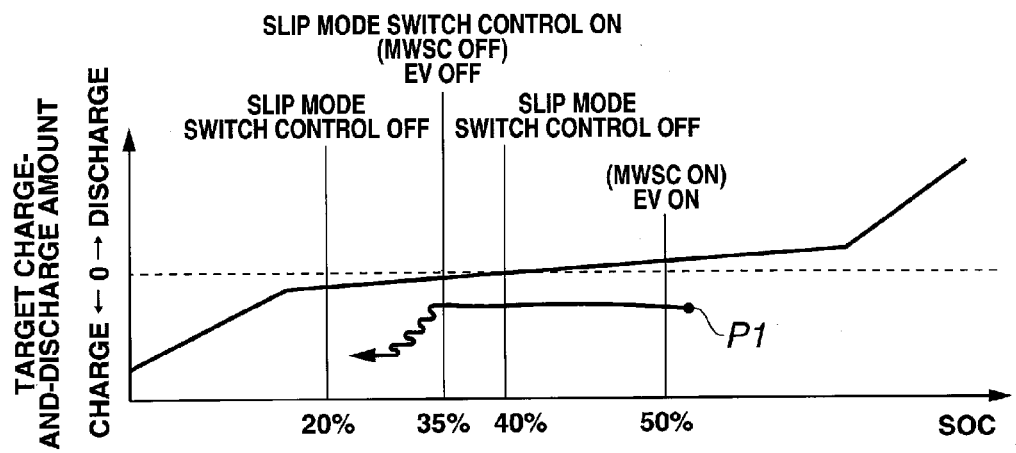
FIG. 22 is a schematic diagram of the target charge-and-discharge amount map on which the motion of the SOC shown in the timing chart in FIG. 21 is depicted.

Next, an operation of the slip mode switch control on a basis of the flowchart described above is explained. FIG. 21 shows a timing chart representing a situation under which selection of both of MWSC drive mode and WSC drive mode alternates in accordance with temperature TempCL2 of second clutch CL2. FIG. 22 is a graph of the SOC in accordance with the timing chart shown in FIG. 21 depicted on the target charge-and-discharge amount map.

As shown in FIG. 22, if the SOC is larger than 50% and the MWSC drive mode is selected and continued, the SOC is gradually reduced. As viewed from FIG. 22, point P1 is gradually moved in the leftward direction.

At a time point t1 in FIG. 21, the SOC is below 35%, so the SOC side slip mode switch control request is output. Thus, the slip mode switch control request is output irrespective of a presence or absence of the temperature side slip mode switch control request. At this time, control based on the presence or absence of the MWSC drive mode region in the normal control is released.

At time point t1, since temperature TempCL2 of second clutch CL2 is lower than lower limit temperature Temp4, the WSC drive mode is selected. Since the vehicle is in the WSC drive mode, the power generation request is simultaneously carried out, and the SOC begins to recover (refer to FIGS. 7 and 8A, 8B and 8C). As viewed from FIG. 22, point P1 is gradually moved in the leftward direction. Since the amount of slippage second clutch CL2 is large, temperature TempCL2 of second clutch CL2 begins to rise.

At a time point t2, temperature TempCL2 of second clutch CL2 is above upper limit temperature Temp3, so the MWSC drive mode is selected irrespective of the state of SOC. It should be noted that the rate of reduction of the SOC is small at this time point, although the SOC has not recovered to the SOC at a time point at which the slip mode switch control started.

Since the vehicle is in the MWSC drive mode, only motor-generator MG is used for the driving force of the vehicle. Thus, the SOC is gradually reduced, and the amount of slippage of second clutch CL2 is reduced. Hence, temperature TempCL2 of second clutch CL2 is gradually reduced.

At a time point t3, temperature TempCL2 of second clutch CL2 has been reduced and is below lower limit temperature Temp4. At this time, MWSC drive mode is again selected. Hence, at the same time when the SOC is gradually raised, the amount of slippage of second clutch CL2 is increased. Hence, temperature TempCL2 of second clutch CL2 gradually increases.

Thereafter, the operations at time points t1 through t3 are repeated. During this time duration, temperature TempCL2 of second clutch CL2 is fluctuating between upper limit temperature Temp3 and lower limit temperature Temp4. On the other hand, the SOC at the time of recovery is gradually reduced while the reduction of the SOC and recovery thereof are repeated, as shown in FIG. 22.

At this time, as compared with a case where the MWSC drive mode is merely continued, it becomes possible to make the rate of reduction of SOC small in the case of the slip mode switch control. Without temperature TempCL2 of second clutch CL2 being above the burning start temperature, an amount of time in which an accelerator hill hold drive can be continued increases while the durability of second clutch CL2 is secured.

Figure 23:
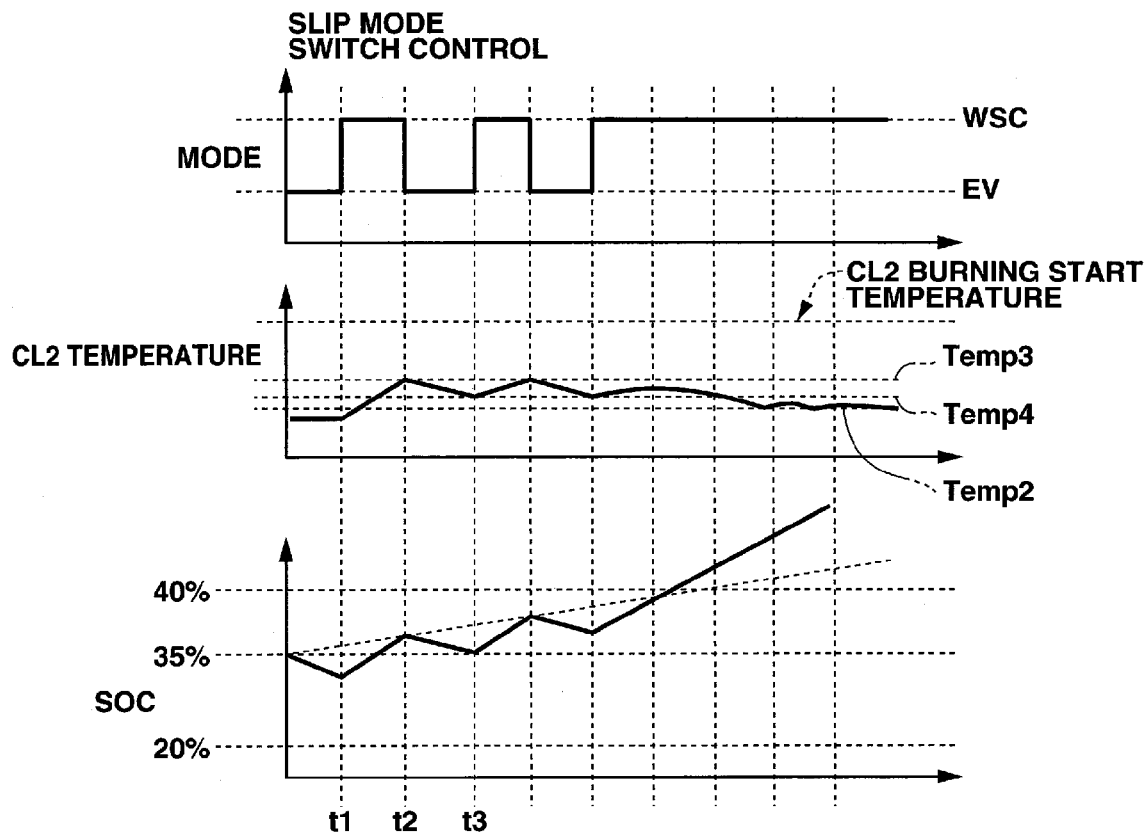
FIG. 23 is a timing chart representing a slip mode switch control in a case where an extremely low vehicle speed run is executed on a flat road in which the estimated road gradient is smaller than the predetermined value.
Figure 24:
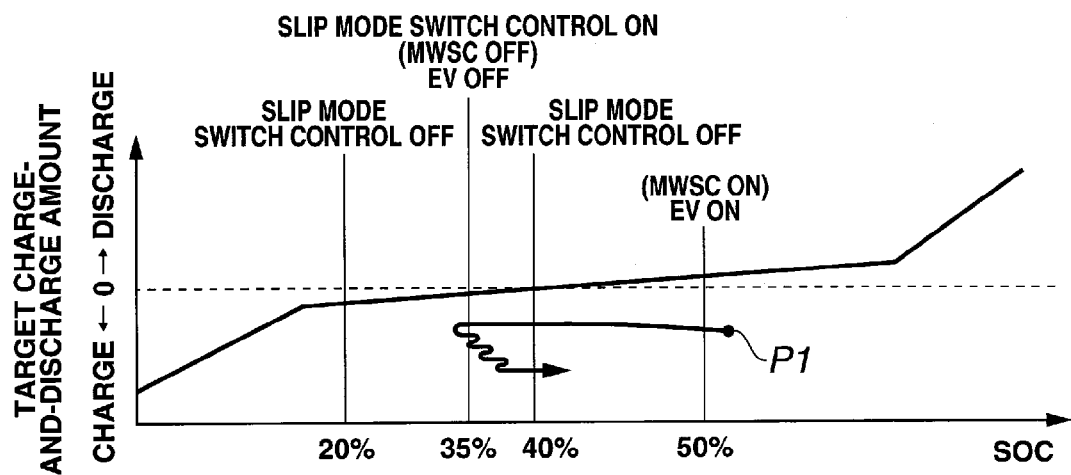
FIG. 24 is a schematic diagram of the target charge-and-discharge amount map on which motion of the SOC shown in the timing chart in FIG. 23 is depicted.

FIG. 23 shows a timing chart representing a situation in which the EV mode and the WSC drive mode are alternately selected in accordance with temperature TempCL2 of second clutch CL2 in the case where an extremely low vehicle speed drive is executed while driving the vehicle on the flat road having an estimated road incline gradient smaller than a predetermined value. FIG. 24 shows a schematic view of the target charge-and-discharge amount map on which motion of the SOC in the timing chart shown in FIG. 23 is depicted.

In the timing chart of FIG. 23, during the execution of the accelerator hill hold drive on a road incline gradient larger than the predetermined value shown in FIGS. 21 and 22, the SOC is gradually reduced since a battery power consumption during the selection of the MWSC drive mode is large as compared with an SOC recovery amount during the selection of the WSC drive mode. On the other hand, during the vehicle travel at the extremely low vehicle speed on a flat road as shown in FIGS. 23 and 24, the battery power consumption during the selection of the EV mode is smaller than the SOC recovery amount during the selection of the WSC drive mode. In this case, the SOC gradually recovers.

At this time, SOC side slip mode switch control request flag fsoc is reset to "0" at a time point at which the SOC reaches SOC=40%. In addition, at a time point at which temperature TempCL2 of second clutch CL2 is reduced and is below control end threshold value Temp2, and temperature side slip mode switch request flag Fs is reset to "0", control is switched from the slip mode switch control to the normal control.

As described above, the following actions and advantages can be obtained in the first embodiment.

(1) The control apparatus for the hybrid vehicle includes the WSC drive mode (engine-used slip drive control means) in which first clutch CL1 is engaged and second clutch CL2 is slip engaged in a state where engine E is operated at a predetermined revolution speed. It also includes the EV mode or MWSC drive mode (motor drive control means) in which first clutch CL1 is disengaged and second clutch CL2 is engaged or slip engaged with the revolution speed of motor-generator MG lower than the predetermined revolution speed. Temperature sensor 10a detects temperature TempCL2 of second clutch CL2, and integrated controller 10 is configured to switch between the WSC drive mode and the EV mode or MWSC drive mode on a basis of temperature TempCL2.

Thus, it becomes possible to control the amount of slippage of second clutch CL2 in accordance with temperature TempCL2 of second clutch CL2. A heat generation amount of second clutch CL2 can be suppressed. In addition, the suppression of the heat generation amount can achieve a continuous drive of the hybrid vehicle at the extremely low vehicle speed region. As compared with the mere continuation of the MWSC drive mode, the slip mode switch control can reduce the rate of reduction of the SOC. Thus, temperature TempCL2 of second clutch CL2 does not exceed the clutch burning start temperature, and the durability of second clutch CL2 can be secured, so the accelerator hill hold execution time can be increased.

(2) Integrated controller 10 selects either the EV mode or the MWSC drive mode (performs the control through the EV mode or the MWSC drive mode) when temperature TempCL2 is equal to or higher than predetermined value (upper limit value) Temp3 described above and selects the WSC drive mode (performs the control through the WSC drive mode) when temperature TempCL2 is smaller than predetermined value Temp4.

Hence, it becomes possible to manage temperature TempCL2 of second clutch CL2 within a predetermined range, and burning of the second clutch CL2 can be prevented. It should be noted that the hysteresis is provided between upper limit temperature Temp3 and lower limit temperature Temp4 in the first embodiment. However, the drive modes may repeatedly be changed with the upper and lower limit temperatures Temp3 and Temp4 set to the same value.

(3) An upper limit temperature Temp3, above which the mode is switched from WSC drive mode to the EV mode or MWSC drive mode, and a lower limit temperature Temp4, below which the mode is switched from the EV or MWSC drive mode to the WSC drive mode, are provided. Road incline gradient estimation calculation section 201 detects or estimates a vehicle load. Integrated controller 10 provides a large difference between upper limit temperature Temp3 and lower limit temperature Temp4 when the estimated road incline gradient is large.

That is, when the vehicle travels on an ascending incline having a large road incline gradient, the rate of increase of the temperature of the second clutch CL2 is fast, and the switching period between the drive modes becomes short. Therefore, upper and lower limit temperatures Temp3 and Temp4 are set to have a large difference between them. Thus, the switching period of the drive modes can be set in a range that does not make the vehicle driver feel discomfort.

(4) When the estimated road incline gradient is large, the value of lower limit temperature Temp4 is made large. Thus, it becomes possible to decrease the temperature TempCL2 when the rate of decrease can be large. Thus, the efficiency of decreasing the temperature can be improved.

(5) When the estimated road incline gradient is equal to or larger than the predetermined value, the MWSC drive mode causes engine E to be in the operated state. Thus, since engine E is in the operated state, an upper limit value of the driving torque of motor-generator MG can be made large. Specifically, as viewed from a required driving force axis, the MWSC drive mode can cope with a higher required driving force than the region of EV drive mode.

(6) When the estimated road incline gradient is equal to or higher than a predetermined gradient value, the MWSC drive mode causes second clutch CL2 to be slip engaged. The revolution speed of motor-generator MG is controlled for the amount of slippage of second clutch CL2 to be a predetermined amount of slippage. Thus, the revolution state of motor-generator MG is secured, and the durability of the switching elements and so forth can be improved.

(7) When the estimated road incline gradient is smaller than a predetermined gradient value, engine E is stopped, and second clutch CL2 is completely engaged. That is, when the driving force is not particularly required, a current value required for motor-generator MG is low. Hence, even if second clutch CL2 is completely engaged, temperature TempCL2 of second clutch CL2 can be assuredly lowered while the durability of the switching elements and so forth is secured.

(8) If the SOC is equal to or larger than a first charge amount such as 50%, the EV mode or MWSC drive mode is selected. While this drive mode is selected, when the SOC is smaller than a second charge amount smaller than the first charge amount, such as 35%, control is switched to the normal control in which the WSC drive mode is selected. During the execution of the normal control, control through the normal control is switched to the slip mode switch control when temperature TemCL2 of second clutch CL2 is equal to or higher than control start threshold value Temp1.

Thus, if second clutch CL2 is excessively heated in a range of a hysteresis characteristic of the SOC, control is forcefully switched to the slip mode switch control. Thus, the durability of second clutch CL2 can be improved.

(9) If the SOC is equal to or larger than the first charge amount such as 50%, the EV mode or the MWSC drive mode is selected. While this drive mode is selected, and the SOC is smaller than a second charge amount smaller than the first charge amount, such as 35%, control is switched to the normal control in which the WSC drive mode is selected. When the SOC is smaller than the second charge amount (here, 35%) during execution of the normal control, control is switched from the normal control to the slip mode switch control.

Thus, in spite of the fact that, in the normal control, the EV mode or the MWSC drive mode is inhibited, the slip mode switch control is selected. Thus, the EV or MWSC drive mode can be selected in accordance with the temperature of second clutch CL2.

As described above, the invention has been explained on a basis of a first embodiment. However, the structure may be another structure and other steps may be performed. For example, the road incline gradient is detected or estimated as the vehicle load in the first embodiment. However, a presence or absence of vehicle traction may be detected or a vehicle weight may be detected as the vehicle load. In a case where the vehicle load is large (heavy), the rise in the vehicle speed is slow, and second clutch CL2 is easily heated.

In addition, temperature sensor 10a is installed to detect a temperature of second clutch CL2. However, the heat generation amount may be estimated on a basis of a difference of revolution of second clutch CL2 or a transmission torque capacity TCL2.

In addition, in the first embodiment, the FR (front engine rear drive vehicle) type hybrid vehicle has been explained. However, the invention may be applied to an FF (front engine front drive) type hybrid vehicle.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A control apparatus for a hybrid vehicle, comprising:
an engine;
a motor configured to output a driving force of the vehicle;
a first clutch installed between the engine and the motor, the first clutch configured to connect and disconnect the engine and the motor;
a second clutch installed between the motor and drive wheels, the second clutch configured to connect and disconnect the motor and the drive wheels;
a temperature detector for detecting a temperature of the second clutch; and
a controller configured to control the first clutch, the second clutch, the engine and the motor, the controller further configured to select a drive mode based on the temperature of the second clutch from at least one of the following:
an engine-used slip drive mode in which the first clutch is engaged, the second clutch is slip engaged, and the engine is operated at a first revolution speed; and
a motor drive mode in which the first clutch is disengaged, the second clutch is at least slip engaged, and the motor is operated at a second revolution speed which is less than the first revolution speed.

2. The control apparatus of claim 1, wherein the controller is further configured to select the motor drive mode when the temperature of the second clutch is equal to or higher than a first temperature value, and to select the engine-used slip drive mode when the temperature is lower than a second temperature value.

3. The control apparatus of claim 2, further comprising:
a vehicle load detector for detecting a vehicle load, wherein the controller is further configured to set the first temperature value smaller than the second temperature value; and
wherein, when a vehicle load detected by the vehicle load detector is greater than a predetermined load value, a difference between the first temperature value and the second temperature value is greater than a predetermined difference value.

4. The control apparatus of claim 3, wherein the controller is further configured to increase the second temperature value when the vehicle load detected by the vehicle load detector increases.

5. The control apparatus of claim 1, further comprising:
a vehicle load detector for detecting a vehicle load, wherein the motor performs a start of the engine and wherein the controller is further configured to operate the engine at a predetermined revolution speed while the first clutch is disengaged in the motor drive mode when the vehicle load detected by the vehicle load detector is greater than a predetermined load value.

6. The control apparatus of claim 1, further comprising:
a vehicle load detector for detecting a vehicle load; wherein the controller is further configured to control the second clutch to be slip engaged and to control the motor to provide a predetermined amount of slippage when the vehicle load detected by the vehicle load detector is greater than a predetermined load value while the motor drive is selected.

7. The control apparatus of claim 1, further comprising:
a vehicle load detector for detecting a vehicle load; and wherein when the vehicle load detected by the vehicle load detector is less than a predetermined load value while the motor drive is selected, the controller is further configured to control the engine to stop and to control the second clutch to completely engage.

8. The control apparatus of claim 1, further comprising:
a battery having a charge amount and configured to supply electric power to the motor; and wherein the controller is further configured to switch to a slip mode switch control based on at least one of the charge amount of the battery and the temperature of the second clutch, the charge amount being between first and second charge amount values and the temperature being either equal to or higher than a first temperature value or lower than a second temperature value.

9. A controller for a hybrid vehicle having an engine, a motor, a first clutch installed between the engine and the motor and a second clutch installed between the motor and drive wheels, the controller comprising:
means for determining a temperature of the second clutch;
means for controlling the engine;
means for controlling the motor; and
means for selecting a drive mode based on the temperature of the second clutch, the drive mode including at least one of the following:
an engine-used slip drive mode in which the first clutch is engaged, the second clutch is slip engaged, and the engine is operated at a predetermined first revolution speed; and
a motor drive mode in which the first clutch is disengaged, the second clutch is at least slip engaged, and the motor is operated at a second revolution speed which is less than the first revolution speed.

10. A control method for a hybrid vehicle including a motor, an engine, a first clutch installed between the engine and the motor, a second clutch installed between the motor and drive wheels and a controller, the method comprising:
determining a temperature of the second clutch; and
selecting a drive mode with the controller based on the temperature of the second clutch from at least one of a motor drive mode and an engine-used slip drive mode, wherein the motor drive mode comprises:
disengaging the first clutch;
slip-engaging the second clutch; and
operating the motor at a second revolution speed which is lower than a first revolution speed; and the engine-used slip drive mode comprises:
engaging the first clutch;
slip-engaging the second clutch; and
operating the engine at the first revolution speed.

11. The control method of claim 10 wherein the motor drive mode is selected when the temperature of the second clutch is equal to or higher than a first temperature value, and the engine-used slip drive mode is selected when the temperature is lower than a second temperature value.

12. The control method of claim 11, further comprising:
detecting a vehicle load; and
setting the first and second temperature values; and wherein, when the vehicle load is greater than a predetermined load value, a difference between the first temperature value and the second temperature value is greater than a predetermined difference value.

13. The control method of claim 12 wherein setting the first and second temperature values comprises increasing the second temperature value when the vehicle load increases.

14. The control method of claim 10, further comprising:
detecting a vehicle load; and wherein, when the motor drive mode is selected and the vehicle load is greater than a predetermined load value, the method further includes:
controlling the engine at a predetermined revolution speed while the first clutch is disengaged; and
controlling the motor to provide a predetermined amount of slippage to the slip-engaged second clutch.

15. The control method of claim 10, further comprising:
detecting a vehicle load; and,
stopping the engine and completely engaging the second clutch when the vehicle load is less than a predetermined load value when the motor drive mode is selected.

16. The control method of claim 10, further comprising:
supplying electric power to the motor with a battery having a charge amount; and
selecting a slip mode switch control when the charge amount is between first and second charge amount values and when the temperature is either equal to or higher than a first temperature value or lower than a second temperature value.

* * * * *